United States Patent
Yoshizawa et al.

(10) Patent No.: US 12,320,971 B2
(45) Date of Patent: Jun. 3, 2025

(54) OPTICAL SCANNING DEVICE, DRIVING METHOD OF OPTICAL SCANNING DEVICE, AND IMAGE DRAWING SYSTEM

(71) Applicant: FUJIFILM Corporation, Tokyo (JP)

(72) Inventors: Hirotoshi Yoshizawa, Kanagawa (JP); Shinichiro Sonoda, Kanagawa (JP); Yoshikazu Hishinuma, Kanagawa (JP); Nobuya Tanaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 545 days.

(21) Appl. No.: 17/738,515

(22) Filed: May 6, 2022

(65) Prior Publication Data
US 2022/0382043 A1  Dec. 1, 2022

(30) Foreign Application Priority Data
Jun. 1, 2021  (JP) .................. 2021-092418

(51) Int. Cl.
*G02B 26/08* (2006.01)
*G02B 26/10* (2006.01)
*H02K 1/12* (2006.01)
*H02K 1/34* (2006.01)
*H04N 9/31* (2006.01)

(52) U.S. Cl.
CPC ......... *G02B 26/0858* (2013.01); *G02B 26/10* (2013.01); *H02K 1/12* (2013.01); *H02K 1/34* (2013.01); *H04N 9/3129* (2013.01)

(58) Field of Classification Search
CPC ...... G02B 26/0858; G02B 26/10; H02K 1/12; H02K 1/34; H04N 9/3129

USPC ....................................................... 310/12.06
See application file for complete search history.

(56) References Cited

U.S. PATENT DOCUMENTS

| | | | |
|---|---|---|---|
| 2008/0297868 A1 | 12/2008 | Mizumoto | |
| 2016/0011290 A1* | 1/2016 | Iannello | A61B 5/055 600/422 |
| 2018/0176524 A1 | 6/2018 | Kobori et al. | |
| 2021/0058592 A1* | 2/2021 | Akanuma | G02B 26/0833 |
| 2021/0333542 A1* | 10/2021 | Chikaoka | B81B 3/0045 |
| 2021/0349284 A1* | 11/2021 | Horiguchi | H02K 41/0356 |

(Continued)

FOREIGN PATENT DOCUMENTS

| | | |
|---|---|---|
| JP | 2003-4851 A | 1/2003 |
| JP | 2007-226108 A | 9/2007 |

(Continued)

OTHER PUBLICATIONS

Okuda et al., WO 2019/163754 English Machine Translation (Year: 2019).*

(Continued)

*Primary Examiner* — Rashad H Johnson
(74) *Attorney, Agent, or Firm* — Birch, Stewart, Kolasch & Birch, LLP

(57) ABSTRACT

A driving controller provides a first driving signal having a first driving frequency to a first actuator that causes a mirror portion to swing around a first axis, provides a second driving signal having a second driving frequency to a second actuator that causes the mirror portion to swing around a second axis intersecting with the first axis, and derives a first driving condition of the first actuator under which the first driving frequency is less than a first resonance frequency around the first axis.

19 Claims, 21 Drawing Sheets

(56) References Cited

U.S. PATENT DOCUMENTS

| | | | | |
|---|---|---|---|---|
| 2021/0405350 A1* | 12/2021 | Naono | ............... | H10N 30/853 |
| 2022/0043257 A1* | 2/2022 | Naono | ............... | G02B 26/0858 |
| 2022/0326509 A1* | 10/2022 | Aoshima | ............... | G02B 26/105 |
| 2022/0382043 A1* | 12/2022 | Yoshizawa | ............... | H04N 9/3129 |
| 2022/0404613 A1* | 12/2022 | Yoshizawa | ............... | H04N 9/3135 |
| 2023/0074021 A1* | 3/2023 | Aoshima | ............... | G02B 26/0858 |
| 2023/0139572 A1* | 5/2023 | Nishiura | ............... | G02B 26/101 |
| | | | | 359/199.4 |
| 2023/0152573 A1* | 5/2023 | Kurashina | ............... | G02B 26/0841 |
| | | | | 359/224.1 |
| 2023/0221546 A1* | 7/2023 | Naono | ............... | G02B 26/101 |
| | | | | 359/199.4 |
| 2023/0221547 A1* | 7/2023 | Naono | ............... | G02B 26/101 |
| | | | | 359/212.1 |
| 2023/0305116 A1* | 9/2023 | Naono | ............... | G01S 7/4915 |
| 2023/0305293 A1* | 9/2023 | Sonoda | ............... | G02B 26/0858 |
| 2023/0314793 A1* | 10/2023 | Sonoda | ............... | G03B 21/008 |
| | | | | 359/224.1 |
| 2023/0350193 A1* | 11/2023 | Nishiura | ............... | G02B 26/105 |
| 2024/0036305 A1* | 2/2024 | Naono | ............... | G09G 3/346 |
| 2024/0146317 A1* | 5/2024 | Brunner | ............... | H03L 7/0992 |
| 2024/0159877 A1* | 5/2024 | Brunner | ............... | G01B 7/30 |
| 2024/0241368 A1* | 7/2024 | Matsumaru | ............... | G02B 26/0858 |
| 2024/0288681 A1* | 8/2024 | Nakamura | ............... | B81B 3/0045 |

FOREIGN PATENT DOCUMENTS

| | | |
|---|---|---|
| JP | 2011-118250 A | 6/2011 |
| JP | 2012-237788 A | 12/2012 |
| JP | 2013-235161 A | 11/2013 |
| JP | 2016-156913 A | 9/2016 |
| JP | 2016-184018 A | 10/2016 |
| JP | 2018-101040 A | 6/2018 |
| JP | 6833127 B1 | 2/2021 |
| WO | WO 2019/163754 A1 | 8/2019 |

OTHER PUBLICATIONS

Japanese Office Action for Japanese Application No. 2021-092418, dated Oct. 1, 2024, with an English translation.

Mendicino et al., "Electro-mechanical validation of a resonant MEMS mirror with PZT actuation and PZR sensing," Proc. SPIE, MOEMS and Miniaturized Systems XX, vol. 11697, Mar. 5, 2021, total 17 pages.

Extended European Search Report for European Application No. 22172413.1, dated Nov. 2, 2022.

Seo et al., "Scanning MEMS Mirror for High Definition and High Frame Rate Lissajous Patterns," Micromachines, vol. 10, No. 67, 2019, pp. 1-8.

European Communication pursuant to Article 94(3) EPC for European Application No. 22172413.1, dated Mar. 4, 2025.

* cited by examiner

SUPERIMPOSITION

OPTICAL SCANNING DEVICE, DRIVING METHOD OF OPTICAL SCANNING DEVICE, AND IMAGE DRAWING SYSTEM

CROSS-REFERENCE TO RELATED APPLICATIONS

The present application claims priority under 35 U.S.C. § 119 to Japanese Patent Application No. 2021-092418 filed on Jun. 1, 2021. The above application is hereby expressly incorporated by reference, in its entirety, into the present application.

BACKGROUND

1. Technical Field

The present disclosure relates to an optical scanning device, a driving method of an optical scanning device, and an image drawing system.

2. Description of the Related Art

A micromirror device (also referred to as a microscanner) is known as one of micro electro mechanical systems (MEMS) devices manufactured using the silicon (Si) microfabrication technique. An optical scanning device comprising the micromirror device is small and has low power consumption. Thus, applications in image drawing systems such as laser displays or laser projectors are expected.

In the micromirror device, a mirror portion is formed to be capable of swinging around a first axis and a second axis that are orthogonal to each other, and light reflected by the mirror portion is two-dimensionally scanned by the swing of the mirror portion around each axis. In addition, a micromirror device that enables Lissajous scanning of light by causing a mirror portion to resonate around each axis has been known.

JP2016-184018A discloses an optical deflection device that selects a resonance frequency of a first axis as a driving frequency of the first axis and calculates candidates of a combination of a frame rate with which a Lissajous figure not overlapping within one field can be provided, and a driving frequency of a second axis based on the resonance frequency of the first axis. This optical deflection device selects a candidate of the combination of the frame rate and the driving frequency of the second axis including a frequency closest to a resonance frequency of the second axis from the calculated candidates of the combination of the frame rate and the driving frequency of the second axis.

JP2018-101040A discloses an optical scanning device including a sensor that detects a rotation angle of a mirror portion, and a look-up table in which a correction amount that is used for correcting an amplitude and a phase of the rotation angle of the mirror portion obtained from the sensor and corresponds to each temperature is stored.

SUMMARY

A micromirror device that has characteristics such that a deflection angle of a mirror portion around a first axis rapidly changes in a case where a frequency of a driving signal for causing the mirror portion to swing around the first axis exceeds a specific frequency (for example, a resonance frequency) has been known. In a case where the deflection angle of the mirror portion around the first axis rapidly changes, the deflection angle of the mirror portion around a second axis is affected. Thus, a drawing region of an image may be repeatedly changed between a vertically long region and a horizontally long region. In this case, the image cannot be stably drawn.

The present disclosure is conceived in view of the above matter, and an object thereof is to provide an optical scanning device, a driving method of an optical scanning device, and an image drawing system that can stably draw an image.

An optical scanning device according to an aspect of the present disclosure is an optical scanning device comprising a mirror portion that has a reflecting surface on which an incidence ray is reflected, a first actuator that causes the mirror portion to swing around a first axis which is in a plane including the reflecting surface at a time of a standstill of the mirror portion, a second actuator that causes the mirror portion to swing around a second axis which is in the plane including the reflecting surface at the time of the standstill of the mirror portion and intersects with the first axis, and at least one processor, in which the processor is configured to provide a first driving signal having a first driving frequency to the first actuator, provide a second driving signal having a second driving frequency to the second actuator, and derive a first driving condition of the first actuator under which the first driving frequency is less than a first resonance frequency around the first axis.

The optical scanning device according to the aspect of the present disclosure may further comprise a first angle detection sensor that outputs a signal corresponding to an angle of the mirror portion around the first axis, in which the processor is configured to derive a first angle of the mirror portion around the first axis based on the output signal of the first angle detection sensor, acquire a phase difference between the first driving signal when the first angle in a case of providing the first driving signal to the first actuator while changing only the first driving frequency out of the first driving frequency and the second driving frequency is the maximum, and the output signal of the first angle detection sensor as a first reference value, and derive the first driving condition under which the phase difference between the first driving signal and the output signal of the first angle detection sensor is less than the first reference value.

In addition, in the optical scanning device according to the aspect of the present disclosure, the processor may be configured to acquire the first reference value as a positive value based on the first driving signal.

In addition, in the optical scanning device according to the aspect of the present disclosure, the processor may be configured to, as an initial setting value before drawing of an image, derive the first driving frequency that is less than the first resonance frequency at a preset driving voltage of the first driving signal.

In addition, in the optical scanning device according to the aspect of the present disclosure, the processor may be configured to, before the drawing of the image, drive the first actuator based on the initial setting value, and repeat processing of deriving the first driving condition under which the first angle is an angle within a preset range and the first driving frequency is less than the first resonance frequency, a plurality of times.

In addition, in the optical scanning device according to the aspect of the present disclosure, the processor may be configured to, during the drawing of the image, repeat the processing of deriving the first driving condition under which the first angle is the angle within the preset range and the first driving frequency is less than the first resonance frequency, a plurality of times.

In addition, in the optical scanning device according to the aspect of the present disclosure, the processor may be configured to derive a second driving condition of the second actuator under which the second driving frequency is greater than a second resonance frequency around the second axis.

In addition, the optical scanning device according to the aspect of the present disclosure may further comprise a second angle detection sensor that outputs a signal corresponding to an angle of the mirror portion around the second axis, in which the processor is configured to derive a second angle of the mirror portion around the second axis based on the output signal of the second angle detection sensor, acquire a phase difference between the second driving signal when the second angle in a case of providing the second driving signal to the second actuator while changing only the second driving frequency out of the first driving frequency and the second driving frequency is the maximum, and the output signal of the second angle detection sensor as a second reference value, and derive the second driving condition under which the phase difference between the second driving signal and the output signal of the second angle detection sensor is greater than the second reference value.

In addition, in the optical scanning device according to the aspect of the present disclosure, the processor may be configured to acquire the second reference value as a positive value based on the second driving signal.

In addition, in the optical scanning device according to the aspect of the present disclosure, the processor may be configured to, as an initial setting value before drawing of an image, derive the second driving frequency that is greater than the second resonance frequency at a preset driving voltage of the second driving signal.

In addition, in the optical scanning device according to the aspect of the present disclosure, the processor may be configured to, before the drawing of the image, drive the second actuator based on the initial setting value, and repeat processing of deriving the second driving condition under which the second angle is an angle within a preset range and the second driving frequency is greater than the second resonance frequency, a plurality of times.

In addition, in the optical scanning device according to the aspect of the present disclosure, the processor may be configured to, during the drawing of the image, repeat the processing of deriving the second driving condition under which the second angle is the angle within the preset range and the second driving frequency is greater than the second resonance frequency, a plurality of times.

In addition, in the optical scanning device according to the aspect of the present disclosure, the first driving frequency may be higher than the second driving frequency.

In addition, in the optical scanning device according to the aspect of the present disclosure, the first driving condition may be at least one of the first driving frequency or a driving voltage of the first driving signal.

In addition, in the optical scanning device according to the aspect of the present disclosure, the second driving condition may be at least one of the second driving frequency or a driving voltage of the second driving signal.

In addition, in the optical scanning device according to the aspect of the present disclosure, the first angle detection sensor may include a pair of angle detection sensors arranged at positions that face each other with the first axis or the second axis interposed between the positions, and the output signal of the first angle detection sensor may be an output signal obtained by adding or subtracting a pair of output signals output from the pair of angle detection sensors.

In addition, in the optical scanning device according to the aspect of the present disclosure, the second angle detection sensor may include a pair of angle detection sensors arranged at positions that face each other with the first axis or the second axis interposed between the positions, and the output signal of the second angle detection sensor may be an output signal obtained by adding or subtracting a pair of output signals output from the pair of angle detection sensors.

In addition, an image drawing system according to another aspect of the present disclosure comprises above any optical scanning device, and a light source that irradiates the mirror portion with light.

In addition, a driving method of an optical scanning device according to still another aspect of the present disclosure is a driving method of an optical scanning device including a mirror portion that has a reflecting surface on which an incidence ray is reflected, a first actuator that causes the mirror portion to swing around a first axis which is in a plane including the reflecting surface at a time of a standstill of the mirror portion, and a second actuator that causes the mirror portion to swing around a second axis which is in the plane including the reflecting surface at the time of the standstill of the mirror portion and intersects with the first axis, the driving method comprising providing a first driving signal having a first driving frequency to the first actuator, providing a second driving signal having a second driving frequency to the second actuator, and deriving a first driving condition of the first actuator under which the first driving frequency is less than a first resonance frequency around the first axis.

According to the present disclosure, an image can be stably drawn.

DETAILED DESCRIPTION

Hereinafter, an embodiment according to the technique of the present disclosure will be described in detail with reference to the drawings.

Figure 1:
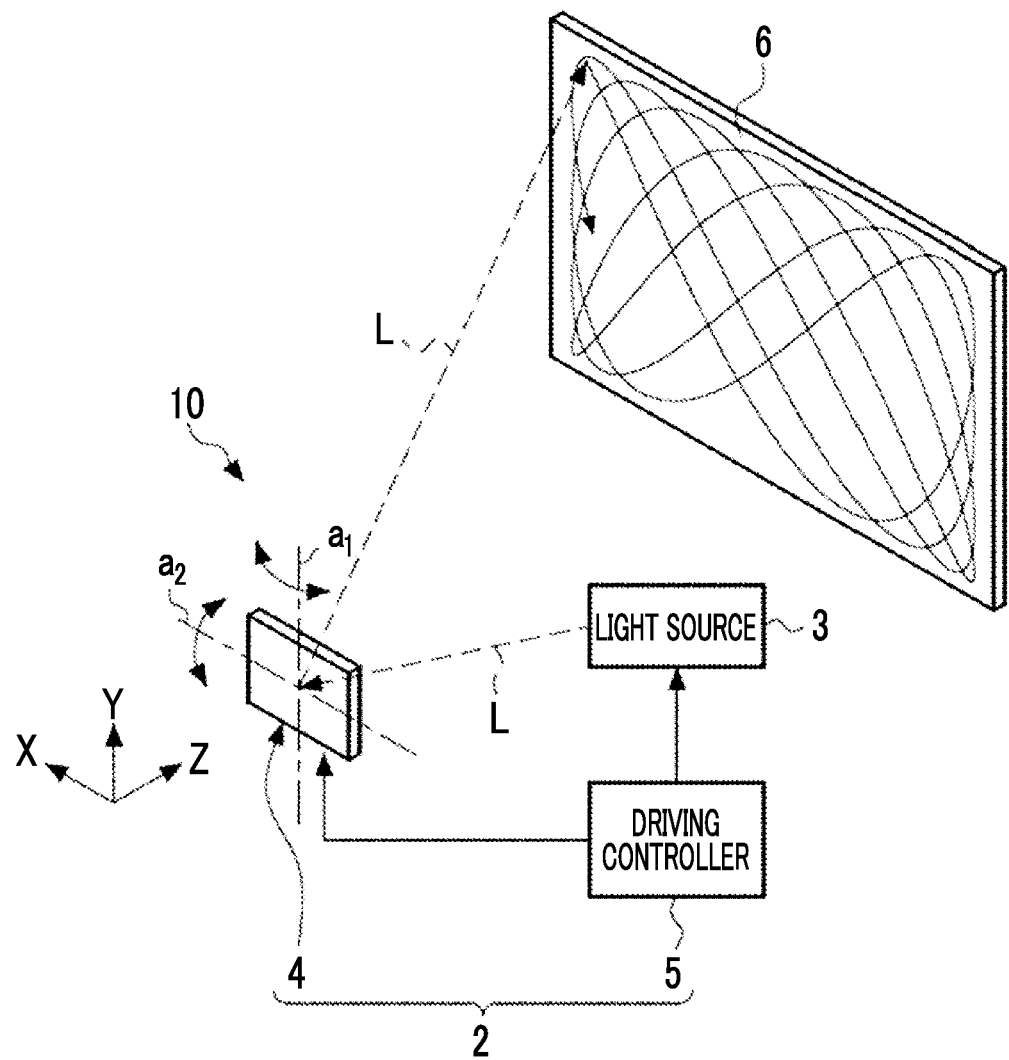
FIG. 1 is a schematic diagram of an image drawing system.

First, a configuration of an image drawing system 10 according to the present embodiment will be described with reference to FIG. 1. As shown in FIG. 1, the image drawing system 10 includes an optical scanning device 2 and a light source 3. The optical scanning device 2 includes a micromirror device (hereinafter, referred to as an "MMD") 4 and a driving controller 5. The driving controller 5 is an example of a processor according to the embodiment of the technique of the disclosure.

The image drawing system 10 draws an image by optically scanning a surface to be scanned 6 by reflecting a light beam L of irradiation from the light source 3 by the MMD 4 under control of the driving controller 5. The surface to be scanned 6 is, for example, a screen for projecting the image, or a retina of an eye of a person.

The image drawing system 10 is applied to, for example, a Lissajous scanning type laser display. Specifically, the image drawing system 10 can be applied to a laser scanning display such as augmented reality (AR) glasses or virtual reality (VR) glasses.

The MMD 4 is a piezoelectric biaxial drive type micromirror device capable of causing a mirror portion 20 (see FIG. 2) to swing around a first axis $a_1$ and a second axis $a_2$ orthogonal to the first axis $a_1$. Hereinafter, a direction parallel to the second axis $a_2$ will be referred to as an X direction, a direction parallel to the first axis $a_1$ will be referred to as a Y direction, and a direction orthogonal to the first axis $a_1$ and the second axis $a_2$ will be referred to as a Z direction. In the present embodiment, while an example in which the first axis $a_1$ is orthogonal to (that is, perpendicularly intersects with) the second axis $a_2$ is shown, the first axis $a_1$ may intersect with the second axis $a_2$ at an angle other than 90°. Here, intersecting means being within a constant angle range centered at 90 degrees including an allowable error.

The light source 3 is a laser device that emits, for example, laser light as the light beam L. For example, the light source 3 outputs laser light of three colors of red (R), green (G), and blue (B). It is preferable that the light source 3 perpendicularly irradiates a reflecting surface 20A (see FIG. 2) comprised in the mirror portion 20 with the light beam L in a state where the mirror portion 20 of the MMD 4 is at a standstill. In a case where the reflecting surface 20A is perpendicularly irradiated with the light beam L from the light source 3, the light source 3 may be an obstacle in the drawing by scanning the surface to be scanned 6 with the light beam L. Thus, it is preferable that the reflecting surface 20A is perpendicularly irradiated with the light beam L emitted from the light source 3 by controlling the light beam L by an optical system. The optical system may include a lens or may not include a lens. In addition, an angle at which the reflecting surface 20A is irradiated with the light beam L emitted from the light source 3 is not limited to a perpendicular angle. The reflecting surface 20A may be irradiated with the light beam L in an inclined manner.

The driving controller 5 outputs a driving signal to the light source 3 and the MMD 4 based on optical scanning information. The light source 3 generates the light beam L based on the input driving signal and irradiates the MMD 4 with the light beam L. The MMD 4 causes the mirror portion 20 to swing around the first axis $a_1$ and the second axis $a_2$ based on the input driving signal.

By causing the mirror portion 20 to resonate around each of the first axis $a_1$ and the second axis $a_2$ by the driving controller 5, the light beam L reflected by the mirror portion 20 is scanned onto the surface to be scanned 6 such that the light beam L draws a Lissajous waveform. This optical scanning method is called a Lissajous scanning method.

Figure 2:
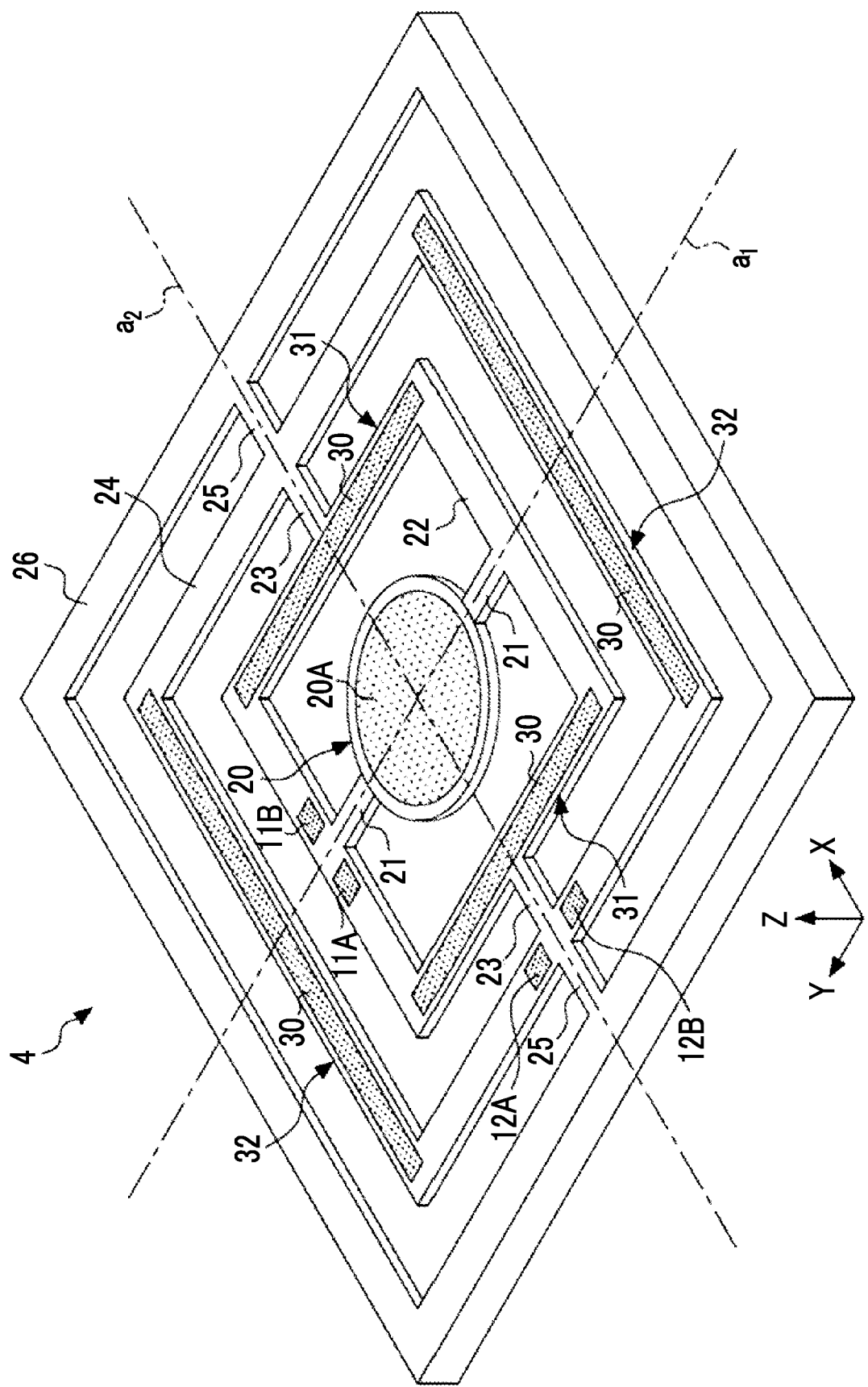
FIG. 2 is an external perspective view of a micromirror device.

Next, a configuration of the MMD 4 according to the present embodiment will be described with reference to FIG. 2. As shown in FIG. 2, the MMD 4 includes the mirror portion 20, a first support portion 21, a first movable frame 22, a second support portion 23, a second movable frame 24, a connecting portion 25, and a fixed frame 26. The MMD 4 is a so-called MEMS scanner.

The mirror portion 20 has the reflecting surface 20A for reflecting an incidence ray. The reflecting surface 20A is provided on one surface of the mirror portion 20 and is formed with a metal thin film of, for example, gold (Au), aluminum (Al), silver (Ag), or a silver alloy. A shape of the reflecting surface 20A is, for example, a circular shape centered at an intersection between the first axis $a_1$ and the second axis $a_2$.

The first axis $a_1$ and the second axis $a_2$ are present in a plane including the reflecting surface 20A at a time of a standstill when the mirror portion 20 is at a standstill. A planar shape of the MMD 4 is a rectangular shape and is axially symmetric with respect to the first axis $a_1$ and axially symmetric with respect to the second axis $a_2$.

The first support portion 21 is arranged outside the mirror portion 20 at each of positions that face each other with the second axis $a_2$ interposed therebetween. The first support portions 21 are connected to the mirror portion 20 on the first axis $a_1$ and support the mirror portion 20 to be capable of swinging around the first axis $a_1$. In the present embodiment, the first support portions 21 are torsion bars that stretch along the first axis $a_1$.

The first movable frame 22 is a frame having a rectangular shape surrounding the mirror portion 20 and is connected to the mirror portion 20 through the first support portion 21 on the first axis $a_1$. A piezoelectric element 30 is formed on the first movable frame 22 at each of positions that face each other with the first axis $a_1$ interposed therebetween. In such a manner, a pair of first actuators 31 are configured by forming two piezoelectric elements 30 on the first movable frame 22.

The pair of first actuators 31 are arranged at positions that face each other with the first axis $a_1$ interposed therebetween. The first actuators 31 cause the mirror portion 20 to swing around the first axis $a_1$ by applying rotational torque around the first axis $a_1$ to the mirror portion 20.

The second support portion 23 is arranged outside the first movable frame 22 at each of positions with the first axis $a_1$ interposed therebetween. The second support portions 23 are connected to the first movable frame 22 on the second axis $a_2$ and support the first movable frame 22 and the mirror portion 20 to be capable of swinging around the second axis $a_2$. In the present embodiment, the second support portions 23 are torsion bars that stretch along the second axis $a_2$.

The second movable frame 24 is a frame having a rectangular shape surrounding the first movable frame 22 and is connected to the first movable frame 22 through the second support portion 23 on the second axis $a_2$. The piezoelectric element 30 is formed on the second movable frame 24 at each of positions that face each other with the second axis $a_2$ interposed therebetween. In such a manner, a pair of second actuators 32 are configured by forming two piezoelectric elements 30 on the second movable frame 24.

The pair of second actuators 32 are arranged at positions that face each other with the second axis $a_2$ interposed therebetween. The second actuators 32 cause the mirror portion 20 to swing around the second axis $a_2$ by applying rotational torque about the second axis $a_2$ to the mirror portion 20 and the first movable frame 22.

The connecting portion 25 is arranged outside the second movable frame 24 at each of positions with the first axis $a_1$ interposed therebetween. The connecting portions 25 are connected to the second movable frame 24 on the second axis $a_2$.

The fixed frame 26 is a frame having a rectangular shape surrounding the second movable frame 24 and is connected to the second movable frame 24 through the connecting portion 25 on the second axis $a_2$.

In addition, a pair of first angle detection sensors 11A and 11B are provided in the first movable frame 22 near the first support portions 21 at positions that face each other with the first axis $a_1$ interposed therebetween. Each of the pair of first angle detection sensors 11A and 11B is configured with a piezoelectric element. Each of the first angle detection sensors 11A and 11B outputs a signal by converting a force applied by deformation of the first support portion 21 accompanied by rotational movement of the mirror portion 20 around the first axis $a_1$ into a voltage. That is, the first angle detection sensors 11A and 11B output signals corresponding to an angle of the mirror portion 20 around the first axis $a_1$.

In addition, a pair of second angle detection sensors 12A and 12B are provided in the second movable frame 24 near the second support portions 23 at positions that face each other with the second axis $a_2$ interposed therebetween. Each of the pair of second angle detection sensors 12A and 12B is configured with a piezoelectric element. Each of the second angle detection sensors 12A and 12B outputs a signal by converting a force applied by deformation of the second support portion 23 accompanied by rotational movement of the mirror portion 20 around the second axis $a_2$ into a voltage. That is, the second angle detection sensors 12A and 12B output signals corresponding to the angle of the mirror portion 20 around the second axis $a_2$.

In FIG. 2, wiring lines and electrode pads for providing driving signals to the first actuators 31 and the second actuators 32 are not shown. In addition, in FIG. 2, wiring lines and electrode pads for outputting signals from the first angle detection sensors 11A and 11B and the second angle detection sensors 12A and 12B are not shown. A plurality of electrode pads are provided on the fixed frame 26.

A deflection angle (hereinafter, referred to as a "first deflection angle") of the mirror portion 20 around the first axis $a_1$ is controlled by the driving signal (hereinafter, referred to as a "first driving signal") provided to the first actuators 31 by the driving controller 5. The first driving signal is, for example, a sinusoidal alternating current voltage. The first driving signal includes a driving voltage waveform $V_{1A}(t)$ applied to one of the pair of first actuators 31 and a driving voltage waveform $V_{1B}(t)$ applied to the other. The driving voltage waveform $V_{1A}(t)$ and the driving voltage waveform $V_{1B}(t)$ are in anti-phase with each other (that is, have a phase difference of 180°).

The first deflection angle is an angle at which a line normal to the reflecting surface 20A is inclined with respect to the Z direction in an XZ plane. In addition, the first deflection angle according to the present embodiment means an angle when the line normal to the reflecting surface 20A is most inclined with respect to the Z direction in the XZ plane in a cycle of the first deflection angle. The first deflection angle is controlled by a driving frequency and a driving voltage of the first driving signal.

A deflection angle (hereinafter, referred to as a "second deflection angle") of the mirror portion 20 around the second axis $a_2$ is controlled by the driving signal (hereinafter, referred to as a "second driving signal") provided to the second actuators 32 by the driving controller 5. The second driving signal is, for example, a sinusoidal alternating current voltage. The second driving signal includes a driving voltage waveform $V_{2A}(t)$ applied to one of the pair of second actuators 32 and a driving voltage waveform $V_{2B}(t)$ applied to the other. The driving voltage waveform $V_{2A}(t)$ and the driving voltage waveform $V_{2B}(t)$ are in anti-phase with each other (that is, have a phase difference of 180°).

The second deflection angle is an angle at which the line normal to the reflecting surface 20A is inclined with respect to the Z direction in a YZ plane. In addition, the second deflection angle according to the present embodiment means an angle when the line normal to the reflecting surface 20A is most inclined with respect to the Z direction in the YZ plane in a cycle of the second deflection angle. The second deflection angle is controlled by a driving frequency and a driving voltage of the second driving signal.

Figure 3:
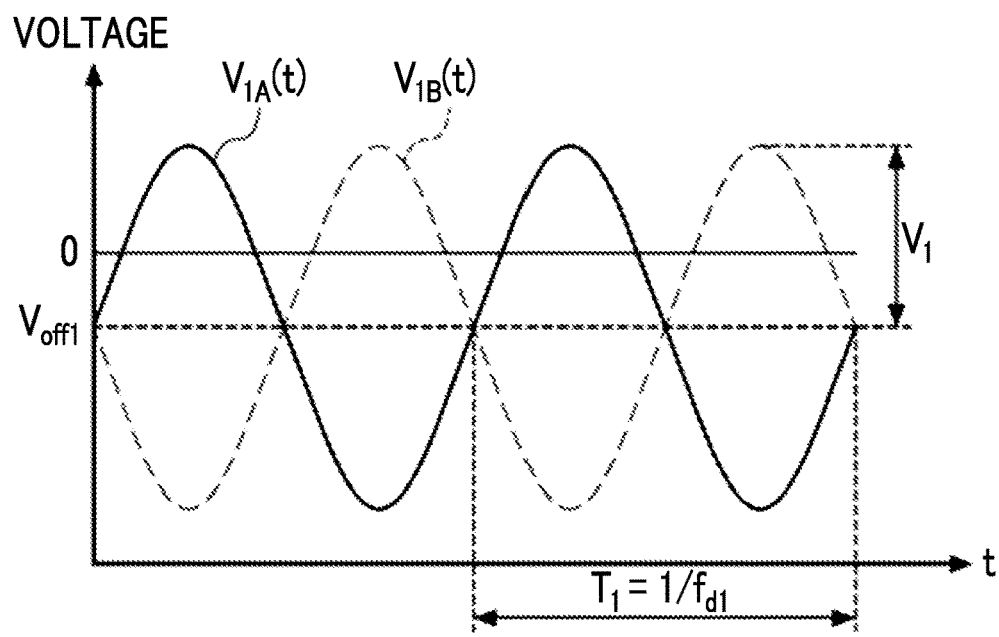
FIG. 3 is a graph showing an example of a first driving signal.
Figure 4:
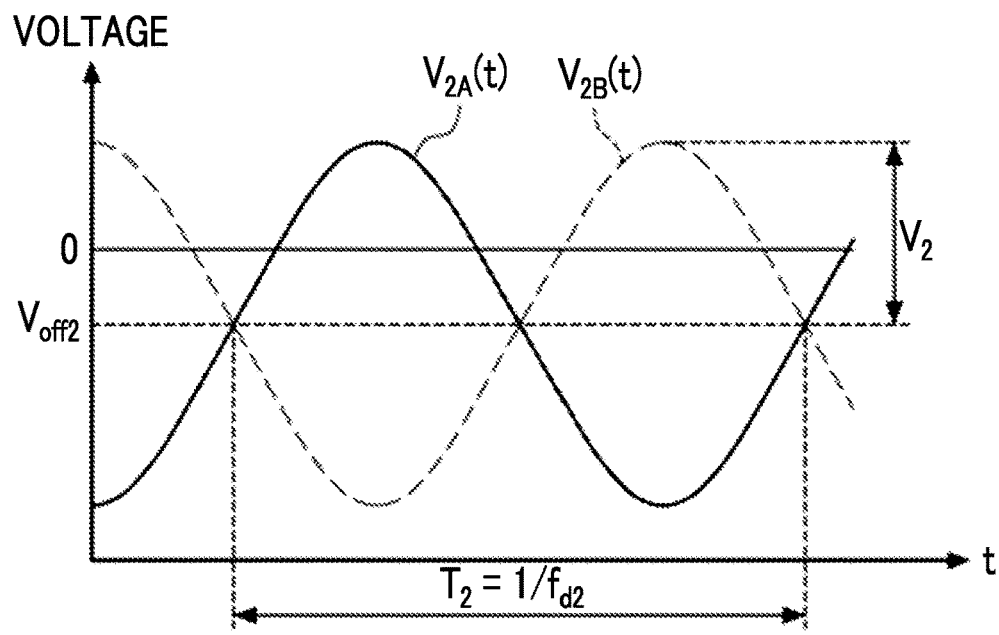
FIG. 4 is a graph showing an example of a second driving signal.

FIG. 3 shows an example of the first driving signal, and FIG. 4 shows an example of the second driving signal. FIG. 3 shows the driving voltage waveforms $V_{1A}(t)$ and $V_{1B}(t)$ included in the first driving signal. FIG. 4 shows the driving voltage waveforms $V_{2A}(t)$ and $V_{2B}(t)$ included in the second driving signal.

Each of the driving voltage waveforms $V_{1A}(t)$ and $V_{1B}(t)$ is represented as follows.

$$V_{1A}(t) = V_{off1} + V_1 \sin(2\pi f_{d1} t)$$

$$V_{1B}(t) = V_{off1} + V_1 \sin(2\pi f_{d1} t + \alpha)$$

Here, $V_1$ is an amplitude voltage. $V_{off1}$ is a bias voltage. $V_{off1}$ may be zero. In addition, $f_{d1}$ is a driving frequency (hereinafter, referred to as a "first driving frequency"). In addition, t is time. In addition, $\alpha$ is a phase difference between the driving voltage waveforms $V_{1A}(t)$ and $V_{1B}(t)$. In the present embodiment, for example, $\alpha = 180°$ is assumed.

By applying the driving voltage waveforms $V_{1A}(t)$ and $V_{1B}(t)$ to the pair of first actuators 31, the mirror portion 20 swings around the first axis $a_1$ with the first driving frequency $f_{d1}$.

Each of the driving voltage waveforms $V_{2A}(t)$ and $V_{2B}(t)$ is represented as follows.

$$V_{2A}(t)=V_{off2}+V_2 \sin(2\pi f_{d2}t+\varphi)$$

$$V_{2B}(t)=V_{off2}+V_2 \sin(2\pi f_{d2}t+\beta+\varphi)$$

Here, $V_2$ is an amplitude voltage. $V_{off2}$ is a bias voltage. $V_{off2}$ may be zero. In addition, $f_{d2}$ is a driving frequency (hereinafter, referred to as a "second driving frequency"). In addition, t is time. In addition, $\beta$ is a phase difference between the driving voltage waveforms $V_{2A}(t)$ and $V_{2B}(t)$. In the present embodiment, for example, $\beta=180°$ is assumed. In addition, $\varphi$ is a phase difference between the driving voltage waveforms $V_{1A}(t)$ and $V_{1B}(t)$ and the driving voltage waveforms $V_{2A}(t)$ and $V_{2B}(t)$.

By applying the driving voltage waveforms $V_{2A}(t)$ and $V_{2B}(t)$ to the pair of second actuators 32, the mirror portion 20 swings around the second axis $a_2$ with the second driving frequency $f_{d2}$.

In the present embodiment, the first driving frequency $f_{d1}$ is set to be higher than the second driving frequency $f_{d2}$. That is, the mirror portion 20 has a higher swing frequency around the first axis $a_1$ than a swing frequency around the second axis $a_2$.

Figure 9:
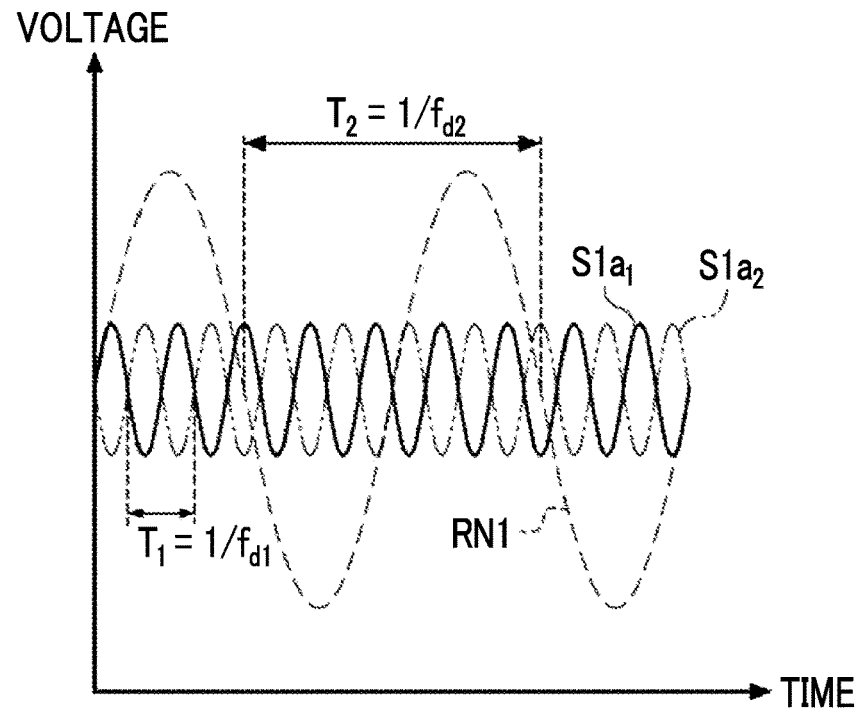
FIG. 9 is a diagram showing an example of signals output from a pair of first angle detection sensors.
Figure 9:
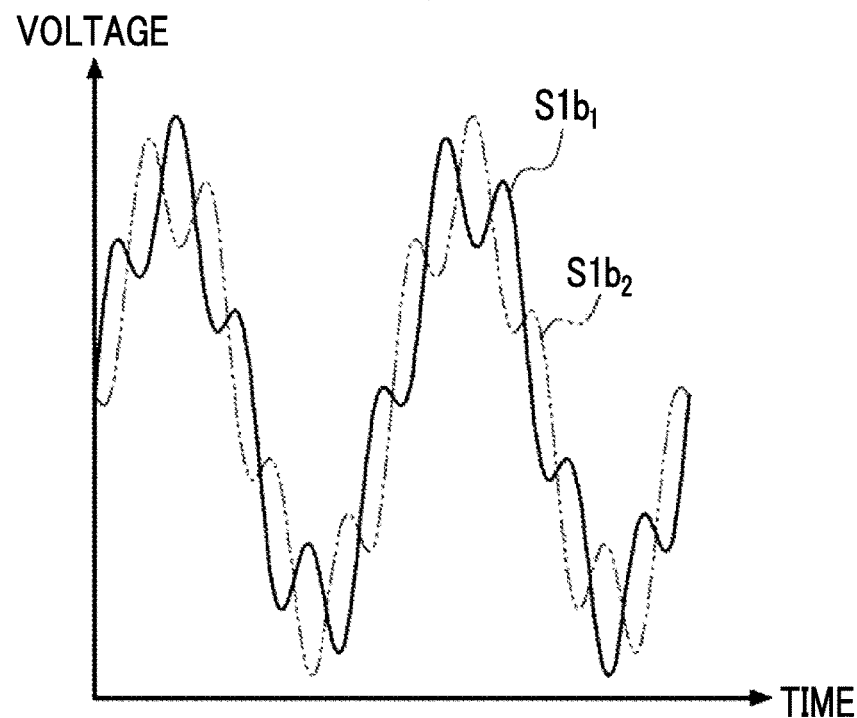

A micromirror device that has characteristics such that an angle of a mirror portion rapidly changes in a case where a frequency of a driving signal provided to an actuator exceeds a specific frequency has been known among micromirror devices that perform Lissajous scanning of light. The MMD 4 according to the present embodiment is a micromirror device having the characteristics. Such characteristics are caused by a so-called hard spring effect and are also shown in FIG. 9 of Reference Literature 1 below. The hard spring effect is a phenomenon in which a resonance frequency moves to a high frequency side as an amplitude is increased.

[Reference Literature 1] G Mendicino, M. Merli, R. Carminati, N. Boni, A. Opreni, A. Frangi, "Electromechanical validation of a resonant MEMS mirror with PZT actuation and PZR sensing", Proc. SPIE 11697, MOEMS and Miniaturized Systems XX, 1169715 (Mar. 5, 2021).

Figure 5:
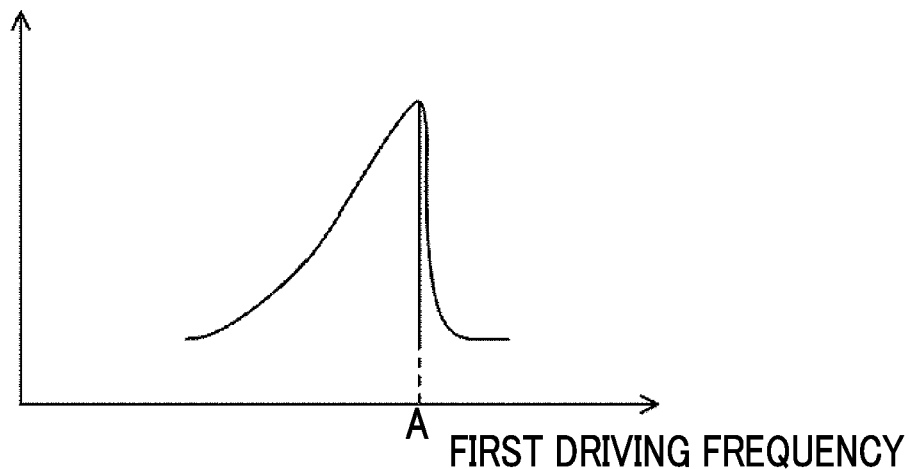
FIG. 5 is a diagram showing an example of a relationship between a first driving frequency and a first deflection angle.

Specifically, in the MMD 4 according to the present embodiment, as shown in FIG. 5 as an example, the first deflection angle is increased as the first driving frequency is increased. However, in a case where the first driving frequency exceeds a specific frequency A, the first deflection angle is rapidly decreased. For example, the specific frequency A is a resonance frequency around the first axis $a_1$. Such characteristics are generally observed in a relatively high band (that is, a band in which the hard spring effect occurs) of the first driving frequency.

Figure 6:
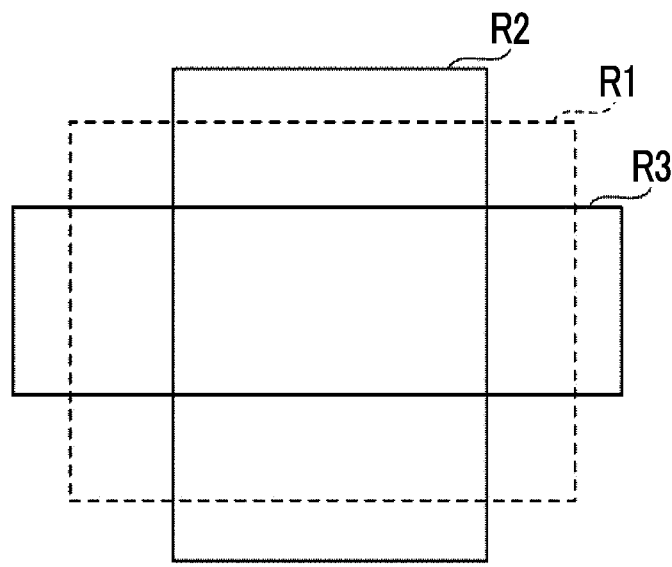
FIG. 6 is a diagram showing an example of a drawing region of an image in a case where the drawing region is unstable.

In a case where the image is drawn by Lissajous scanning using the MMD 4 having such characteristics, a phenomenon in which a shape of a drawing region of the image is unstable is observed. Specifically, as shown in FIG. 6 as an example, a phenomenon in which a vertically long drawing region R2 and a horizontally long drawing region R3 are alternately repeated with respect to a target drawing region R1 having a rectangular shape is observed. The shape of the drawing region is decided by sizes of the first deflection angle and the second deflection angle.

Figure 7:
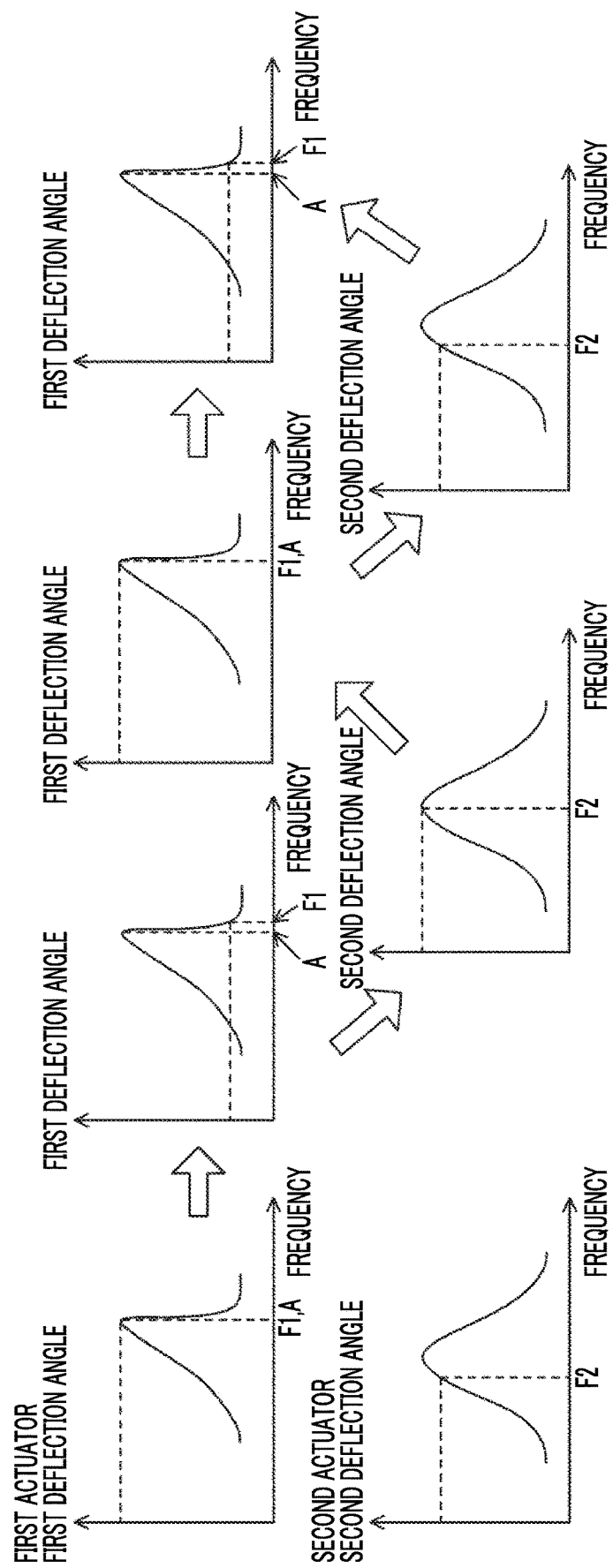
FIG. 7 is a diagram for describing a cause of the unstable drawing region of the image.

A cause of this phenomenon that is considered will be described with reference to FIG. 7. In FIG. 7, F1 denotes the first driving frequency, F2 denotes the second driving frequency, and A denotes the resonance frequency around the first axis $a_1$. As shown in the leftmost graph in FIG. 7, first, it is assumed that the first driving frequency F1 is set to match the resonance frequency A. and the second driving frequency F2 is set to have a preset ratio with the first driving frequency F1. The first driving frequency F1 is set to match the resonance frequency A so that the mirror portion 20 is caused to efficiently swing. The second driving frequency F2 is set to have the preset ratio with the first driving frequency F1 so that the image is drawn with target image quality by adjusting precision of the Lissajous waveform. In addition, in the present embodiment, the first driving frequency F1 is set in a relatively high band in which the hard spring effect occurs, and the second driving frequency F2 is set in a relatively low band in which the hard spring effect does not occur.

In this case, for example, it is assumed that the resonance frequency A around the first axis $a_1$ is slightly decreased due to an influence of the swing of the mirror portion 20 around the second axis $a_2$, an influence of a change in ambient temperature, and the like. In this case, the first driving frequency F1 is higher than the resonance frequency A. Thus, the first deflection angle is rapidly decreased (see the second graph from the left in an upper part of FIG. 7). The resonance frequency around the second axis $a_2$ is decreased by receiving an influence of a rapid decrease in first deflection angle. Accordingly, even in a case w % here the second driving frequency F2 does not change, the second deflection angle is increased (see the second graph from the left in a lower part of FIG. 7). Next, the resonance frequency A around the first axis $a_1$ is increased by receiving an influence of an increase in second deflection angle. Accordingly, the first deflection angle is rapidly increased (see the third graph from the left in the upper part of FIG. 7). It is considered that repetition of the changes in first deflection angle and second deflection angle causes the shape of the drawing region to be unstable.

Therefore, the driving controller 5 according to the present embodiment has a function of deriving a driving condition of the first actuators 31 under which the first driving frequency is less than the resonance frequency.

Figure 8:
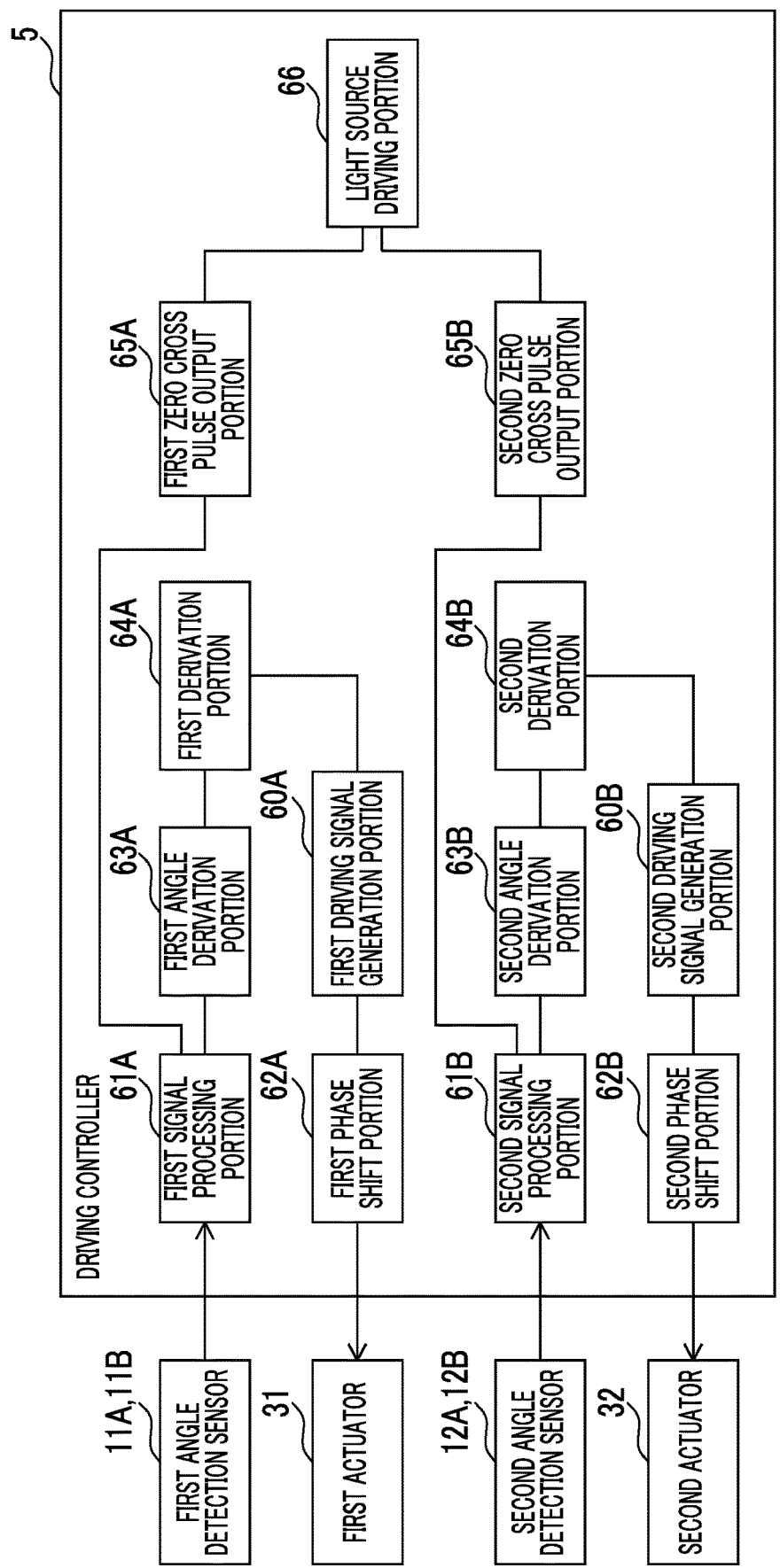
FIG. 8 is a block diagram showing an example of a functional configuration of a driving controller.

Next, a functional configuration of the driving controller 5 will be described with reference to FIG. 8. As shown in FIG. 8, the driving controller 5 includes a first driving signal generation portion 60A, a second driving signal generation portion 60B, a first signal processing portion 61A, a second signal processing portion 61B, a first phase shift portion 62A, a second phase shift portion 62B, a first angle derivation portion 63A, a second angle derivation portion 63B, a first derivation portion 64A, a second derivation portion 64B, a first zero cross pulse output portion 65A, a second zero cross pulse output portion 65B, and a light source driving portion 66.

The first driving signal generation portion 60A generates the first driving signal including the driving voltage waveforms $V_{1A}(t)$ and $V_{1B}(t)$ based on a reference waveform and provides the generated first driving signal to the pair of first actuators 31 through the first phase shift portion 62A. Accordingly, the mirror portion 20 swings around the first axis $a_1$.

The second driving signal generation portion 60B generates the second driving signal including the driving voltage waveforms $V_{2A}(t)$ and $V_{2B}(t)$ based on the reference waveform and provides the generated second driving signal to the pair of second actuators 32 through the second phase shift portion 62B. Accordingly, the mirror portion 20 swings around the second axis $a_2$.

The first driving signal generated by the first driving signal generation portion 60A and the second driving signal generated by the second driving signal generation portion 60B are synchronized in phase as shown by φ in the expression showing the driving voltage waveforms $V_{2A}(t)$ and $V_{2B}(t)$ included in the second driving signal.

The first angle detection sensors 11A and 11B output the signals corresponding to the angle of the mirror portion 20 around the first axis $a_1$. The second angle detection sensors 12A and 12B output the signals corresponding to the angle of the mirror portion 20 around the second axis $a_2$.

FIG. 9 shows an example of the signals output from the pair of first angle detection sensors 11A and 11B. In FIG. 9, $S1a_1$ and $S1a_2$ represent the signals output from the pair of first angle detection sensors 11A and 11B in a case where the mirror portion 20 is caused to swing around only the first axis $a_1$ and not swing around the second axis $a_2$. The signals $S1a_1$ and $S1a_2$ are waveform signals similar to a sinusoidal wave having the first driving frequency $f_{d1}$ and are in anti-phase with each other.

In a case where the mirror portion 20 is caused to swing around the first axis $a_1$ and the second axis $a_2$ at the same time, a vibration noise RN1 caused by the swing of the mirror portion 20 around the second axis $a_2$ is superimposed on the output signals of the pair of first angle detection sensors 11A and 11B. $S1b_1$ represents a signal after the vibration noise RN1 is superimposed on the signal $S1a_1$. $S1b_2$ represents a signal after the vibration noise RN1 is superimposed on the signal $S1a_2$. In the example in FIG. 9, the vibration noise RN1 is shown in a highlighted manner for description of the present embodiment.

Figure 10:
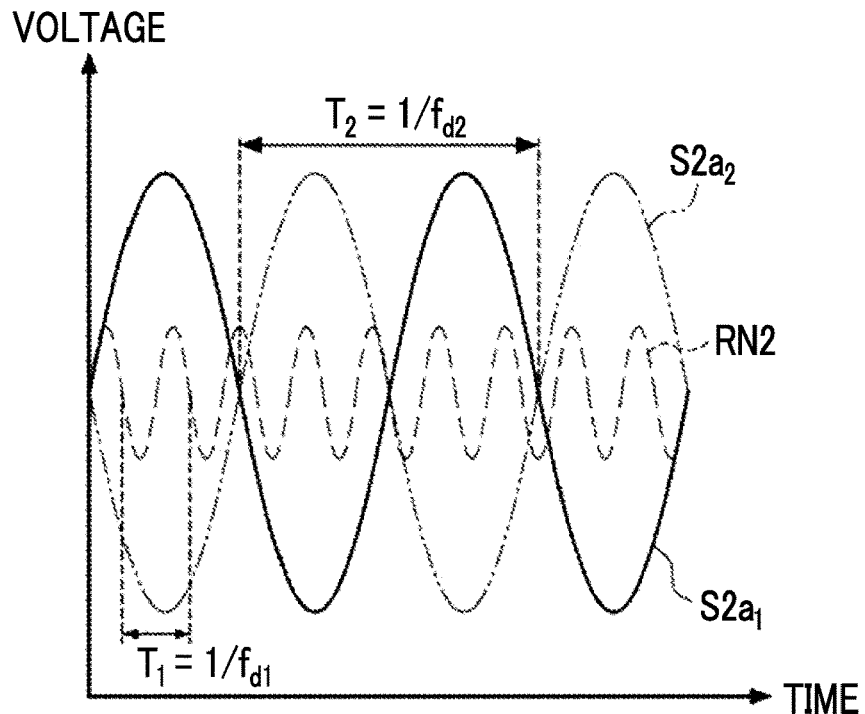
FIG. 10 is a diagram showing an example of signals output from a pair of second angle detection sensors.
Figure 10:
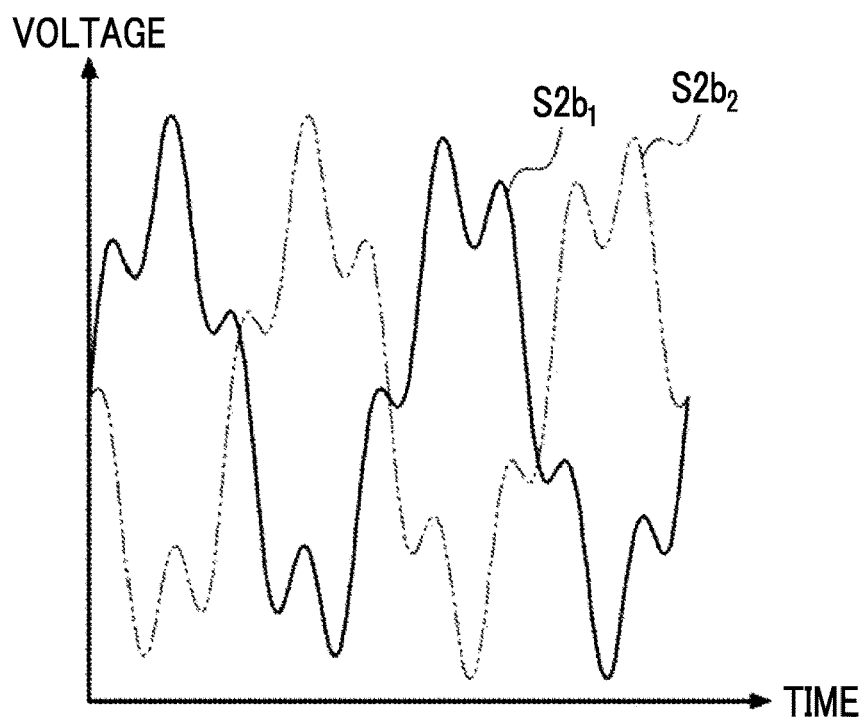

FIG. 10 shows an example of the signals output from the pair of second angle detection sensors 12A and 12B. In FIG. 10, $S2a_1$ and $S2a_2$ represent the signals output from the pair of second angle detection sensors 12A and 12B in a case where the mirror portion 20 is caused to swing around only the second axis $a_2$ and not swing around the first axis $a_1$. The signals $S2a_1$ and $S2a_2$ are waveform signals similar to a sinusoidal wave having the second driving frequency $f_{d2}$ and are in anti-phase with each other.

In a case where the mirror portion 20 is caused to swing around the first axis $a_1$ and the second axis $a_2$ at the same time, a vibration noise RN2 caused by the swing of the mirror portion 20 around the first axis $a_1$ is superimposed on the output signals of the pair of second angle detection sensors 12A and 12B. $S2b_1$ represents a signal obtained by the superimposition of the vibration noise RN2 on the signal $S2a_1$. $S2b_2$ represents a signal obtained by the superimposition of the vibration noise RN2 on the signal $S2a_2$. In the example in FIG. 10, the vibration noise RN2 is shown in a highlighted manner for description of the present embodiment.

The first signal processing portion 61A generates a signal (hereinafter, referred to as a "first angle detection signal") obtained by removing the vibration noise RN1 based on $S1a_1$ and $S1a_2$ output from the pair of first angle detection sensors 11A and 11B. The second signal processing portion 61B generates a signal (hereinafter, referred to as a "second angle detection signal") obtained by removing the vibration noise RN2 based on $S2a_1$ and $S2a_2$ output from the pair of second angle detection sensors 12A and 12B.

Figure 11:
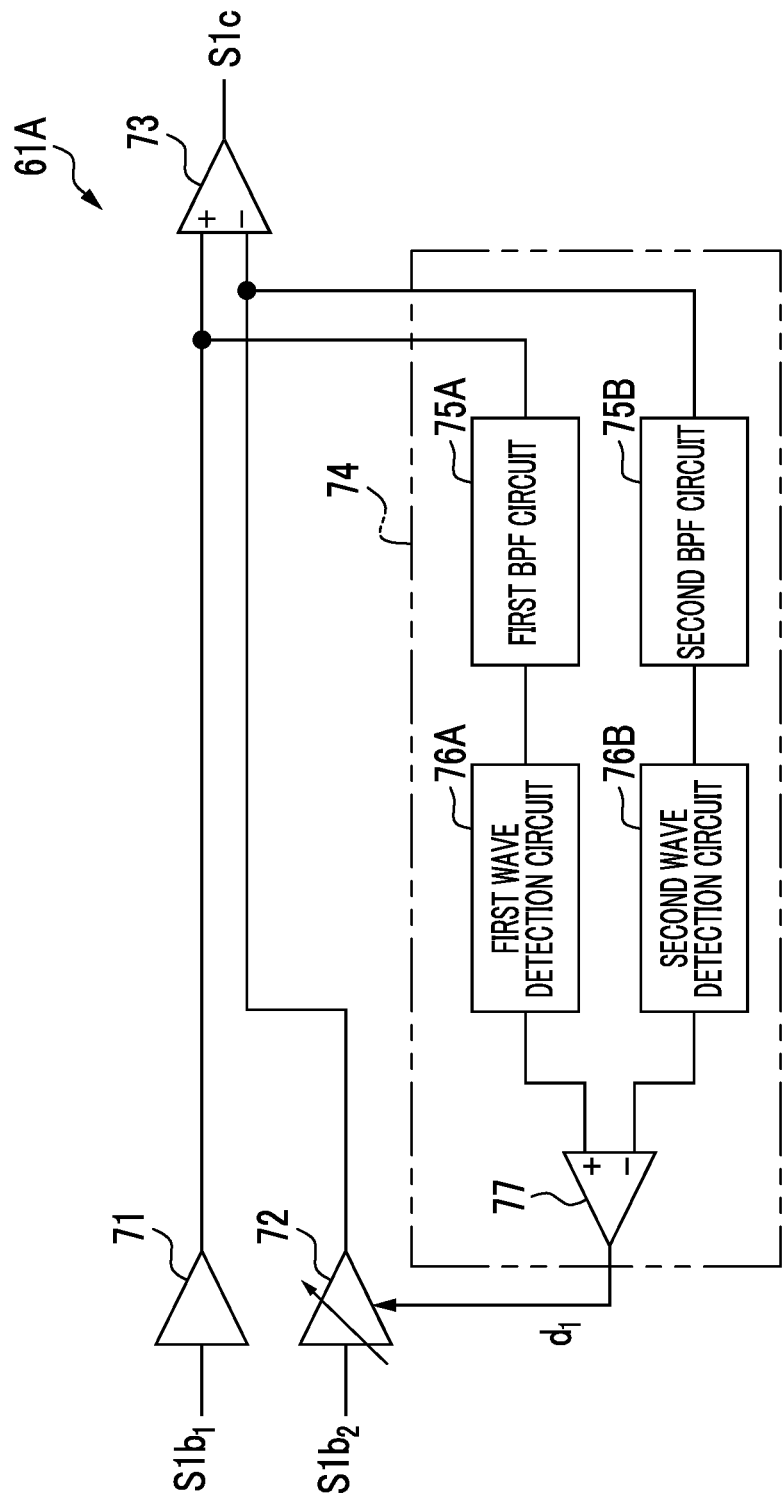
FIG. 11 is a circuit diagram showing an example of a configuration of a first signal processing portion.

The first signal processing portion 61A can be implemented by, for example, a circuit having a configuration shown in FIG. 11 as an example. As shown in FIG. 11, the first signal processing portion 61A is configured with a buffer amplifier 71, a variable gain amplifier 72, a subtraction circuit 73, and a gain adjustment circuit 74. The gain adjustment circuit 74 is configured with a first band pass filter (BPF) circuit 75A, a second BPF circuit 75B, a first wave detection circuit 76A, a second wave detection circuit 76B, and a subtraction circuit 77. The subtraction circuit 73 and the subtraction circuit 77 are differential amplification circuits configured with operational amplifiers.

The signal $S1b_1$ output from the first angle detection sensor 1A is input into a positive input terminal (non-inverting input terminal) of the subtraction circuit 73 through the buffer amplifier 71. In addition, a signal output from the buffer amplifier 71 branches in the middle of being input into the subtraction circuit 73 and is input into the first BPF circuit 75A in the gain adjustment circuit 74.

The signal $S1b_2$ output from the first angle detection sensor 11B is input into a negative input terminal (inverting input terminal) of the subtraction circuit 73 through the variable gain amplifier 72. In addition, a signal output from the variable gain amplifier 72 branches in the middle of being input into the subtraction circuit 73 and is input into the second BPF circuit 75B in the gain adjustment circuit 74.

Each of the first BPF circuit 75A and the second BPF circuit 75B has a passband B1 having the second driving frequency $f_{d2}$ as a center frequency. For example, the passband B1 is a frequency band of $f_{d2}\pm5$ kH. The vibration noise RN1 has the second driving frequency $f_{d2}$ and thus, passes through the passband B1. Accordingly, the first BPF circuit 75A extracts the vibration noise RN1 from the signal input from the buffer amplifier 71 and outputs the vibration noise RN1. The second BPF circuit 75B extracts the vibration noise RN1 from the signal input from the variable gain amplifier 72 and outputs the vibration noise RN1.

Each of the first wave detection circuit 76A and the second wave detection circuit 76B is configured with, for example, a root mean squared value to direct current converter (RMS-DC converter). The first wave detection circuit 76A converts an amplitude of the vibration noise RN1 input from the first BPF circuit 75A into a DC voltage signal and inputs the DC voltage signal into a positive input terminal of the subtraction circuit 77. The second wave detection circuit 76B converts the amplitude of the vibration noise RN1 input from the second BPF circuit 75B into a DC voltage signal and inputs the DC voltage signal into a negative input terminal of the subtraction circuit 77.

The subtraction circuit 77 outputs a value $d_1$ obtained by subtracting the DC voltage signal input from the second wave detection circuit 76B from the DC voltage signal input from the first wave detection circuit 76A. The value $d_1$ corresponds to a difference between the amplitude of the vibration noise RN1 included in the signal $S1b_1$ output from the first angle detection sensor 11A and the amplitude of the vibration noise RN1 included in the signal $S1b_2$ output from the first angle detection sensor 11B. The subtraction circuit 77 inputs the value $d_1$ into a gain adjustment terminal of the variable gain amplifier 72 as a gain adjustment value.

The variable gain amplifier 72 adjusts an amplitude level of the signal $S1b_2$ by multiplying the signal $S1b_2$ input from the first angle detection sensor 11B by the value $d_1$ input as the gain adjustment value. In such a manner, by performing a feedback control by the gain adjustment circuit 74, the amplitude of the vibration noise RN1 included in the signal $S1b_2$ after passing through the variable gain amplifier 72 is adjusted to match the amplitude of the vibration noise RN1 included in the signal $S1b_1$ after passing through the buffer amplifier 71.

The subtraction circuit 73 outputs a value obtained by subtracting the signal S1$b_2$ input to the negative input terminal from the signal S1$b_1$ input to the positive input terminal. Since the amplitudes of the vibration noises RN1 included in both signals are matched by the feedback control, the vibration noises RN1 included in both signals are offset by subtraction processing performed by the subtraction circuit 73. Accordingly, the first angle detection signal S1$c$ (see FIG. 12) that is a signal obtained by removing the vibration noise RN1 is output from the subtraction circuit 73.

Figure 12:
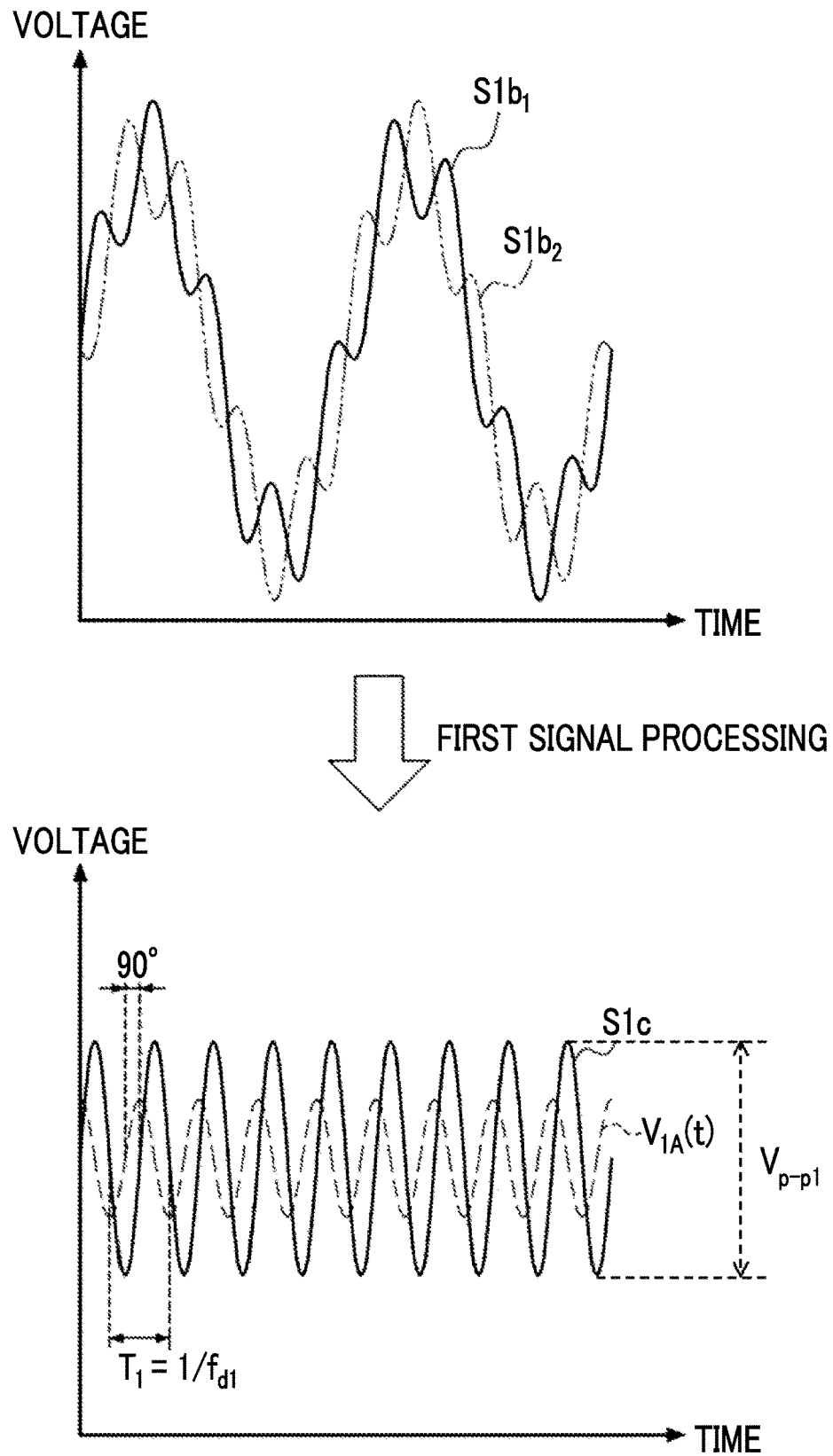
FIG. 12 is a diagram showing an example of first signal processing.

FIG. 12 shows a state where the first angle detection signal S1$c$ is generated based on S1$b_1$ and S1$b_2$ output from the pair of first angle detection sensors 11A and 11B. The first angle detection signal S1$c$ corresponds to a signal obtained by doubling an amplitude of the signal obtained by removing the vibration noise RN1 from the signal S1$b_1$.

In a case where the swing of the mirror portion 20 around the first axis $a_1$ maintains a resonance state, the first angle detection signal S1$c$ output from the first signal processing portion 61A has a delay of 90° in phase with respect to the driving voltage waveform $V_{1A}(t)$ included in the first driving signal as shown in FIG. 12.

The second signal processing portion 61B can be implemented by the same configuration as the first signal processing portion 61A and thus, will not be described.

Figure 13:
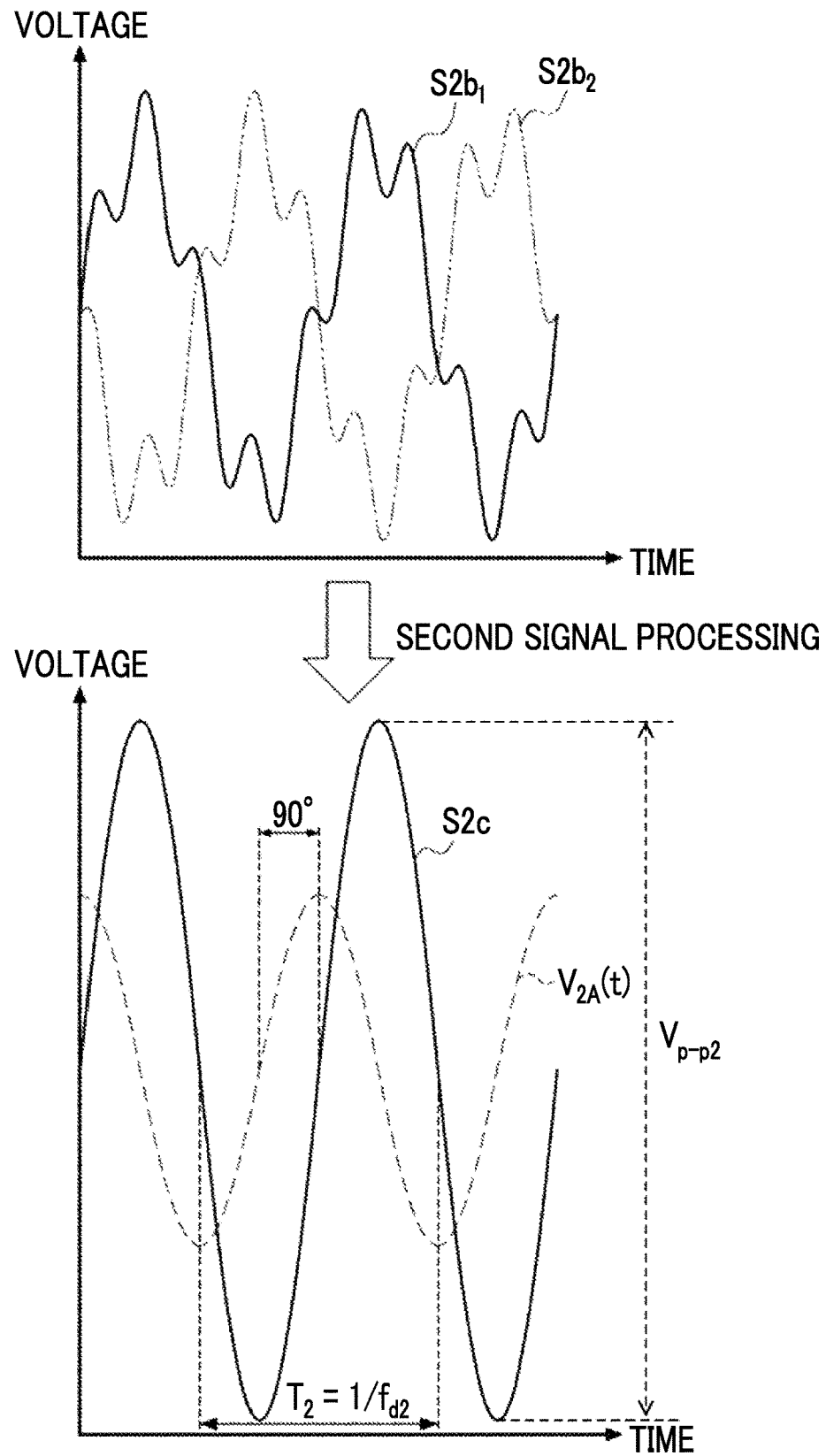
FIG. 13 is a diagram showing an example of second signal processing.

FIG. 13 shows a state where the second angle detection signal S2$c$ is generated based on S2$b_1$ and S2$b_2$ output from the pair of second angle detection sensors 12A and 12B. The second angle detection signal S2$c$ corresponds to a signal obtained by doubling an amplitude of the signal obtained by removing the vibration noise RN2 from the signal S2$b_1$.

In a case where the swing of the mirror portion 20 around the second axis $a_2$ maintains a resonance state, the second angle detection signal S2$c$ output from the second signal processing portion 61B has a delay of 90° in phase with respect to the driving voltage waveform $V_{2A}(t)$ included in the second driving signal as shown in FIG. 13.

The first phase shift portion 62A shifts phases of the driving voltage waveforms output from the first driving signal generation portion 60A. For example, the first phase shift portion 62A shifts the phases by 90°. The second phase shift portion 62B shifts phases of the driving voltage waveforms output from the second driving signal generation portion 60B. For example, the second phase shift portion 62B shifts the phases by 90°.

Figure 14:
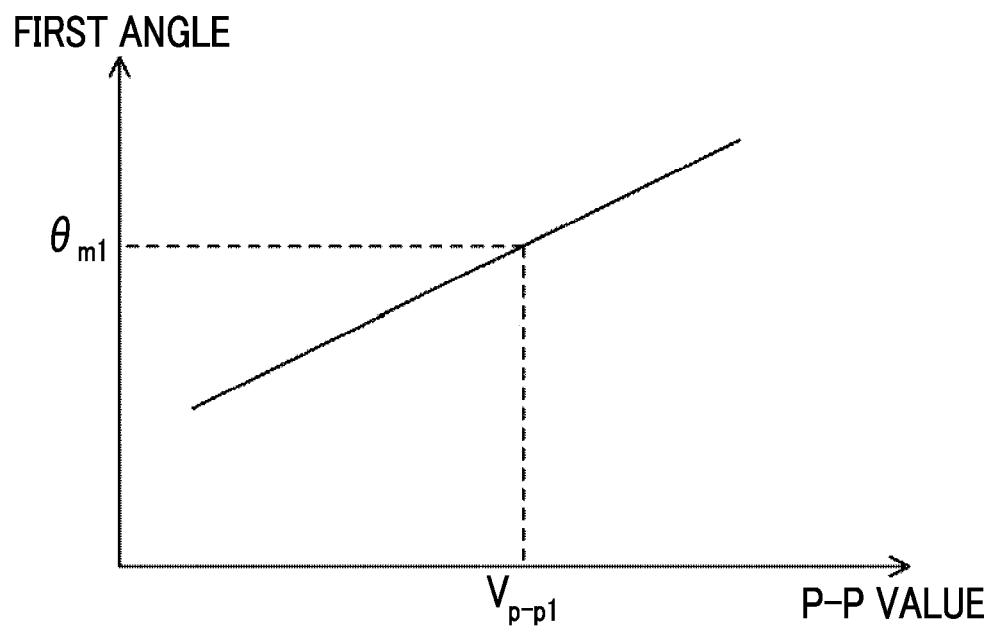
FIG. 14 is a diagram showing an example of a relationship between a first angle and a P-P value.

The first angle derivation portion 63A derives the angle (hereinafter, referred to as a "first angle") of the mirror portion 20 around the first axis $a_1$ based on the first angle detection signal S1$c$. Specifically, the first angle derivation portion 63A obtains a peak to peak (P-P) value $V_{p\text{-}p1}$ corresponding to an amplitude of the first angle detection signal S1$c$ (see FIG. 12). The first angle derivation portion 63A holds data indicating a relationship between the first angle and the P-P value of the first angle detection signal S1$c$ shown in FIG. 14 as an example. Based on this data, the first angle derivation portion 63A derives a first angle $\theta_{m1}$ corresponding to the P-P value $V_{p\text{-}p1}$ obtained from the first angle detection signal S1$c$. The first angle derived by the first angle derivation portion 63A according to the present embodiment corresponds to a double of a maximum value (that is, the first deflection angle) of the angle of the mirror portion 20 around the first axis $a_1$ in a cycle of the first angle.

The second angle derivation portion 63B derives the angle (hereinafter, referred to as a "second angle") of the mirror portion 20 around the second axis $a_2$ based on the second angle detection signal S2$c$. Specifically, the second angle derivation portion 63B obtains a P-P value $V_{p\text{-}p2}$ corresponding to an amplitude of the second angle detection signal S2$c$ (see FIG. 13). In the same manner as the first angle derivation portion 63A, the second angle derivation portion 63B also holds data indicating a relationship between the second angle and the P-P value of the second angle detection signal S2$c$. Based on this data, the second angle derivation portion 63B derives the second angle corresponding to the P-P value $V_{p\text{-}p2}$ obtained from the second angle detection signal S2$c$. The second angle derived by the second angle derivation portion 63B according to the present embodiment corresponds to a double of a maximum value (that is, the second deflection angle) of the angle of the mirror portion 20 around the second axis $a_2$ in a cycle of the second angle.

The first derivation portion 64A acquires a phase difference between the first driving signal and the first angle detection signal S1$c$ when the first angle in a case of providing the first driving signal to the first actuators 31 while changing only the first driving frequency out of the first driving frequency and the second driving frequency is the maximum, as a reference value (hereinafter referred to as a "first reference value"). At this point, the second driving signal is not provided to the second actuators 32. That is, the first derivation portion 64A acquires the first reference value by causing the mirror portion 20 to swing around only the first axis $a_1$ and not swing around the second axis $a_2$.

Figure 15:
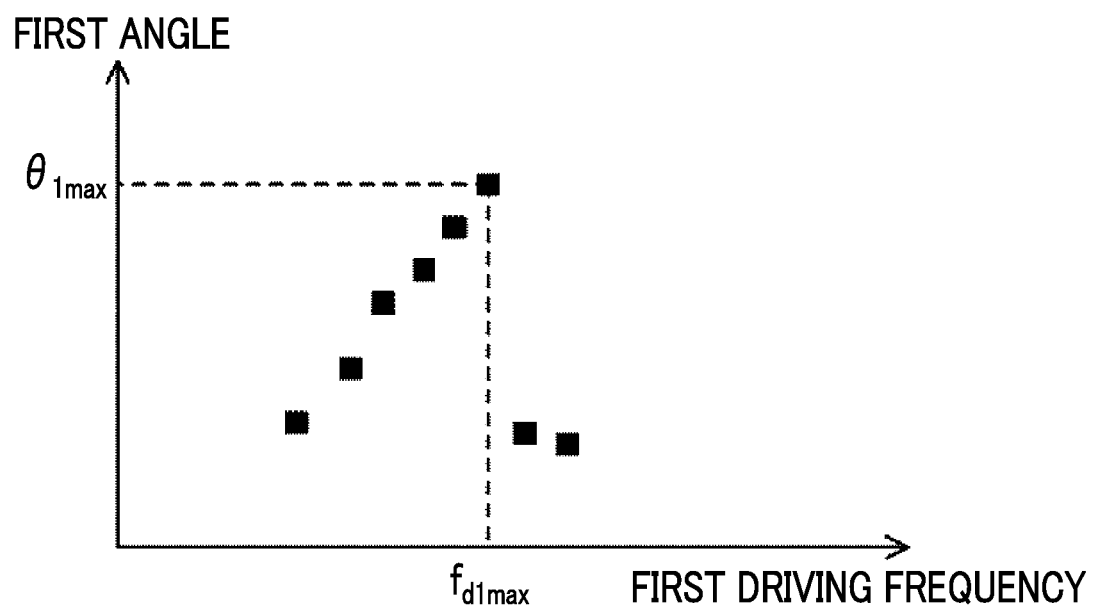
FIG. 15 is a diagram for describing derivation processing of a first reference value.

Specifically, the first derivation portion 64A acquires the first angle that is derived by the first angle derivation portion 63A in a case of providing the first driving signal to the first actuators 31 while changing only the first driving frequency. As shown in FIG. 15 as an example, the first angle is acquired for each of a plurality of first driving frequencies. In the example in FIG. 15, a maximum first angle $\theta_{1max}$ is obtained when the first driving frequency is $f_{d1max}$.

Figure 16:
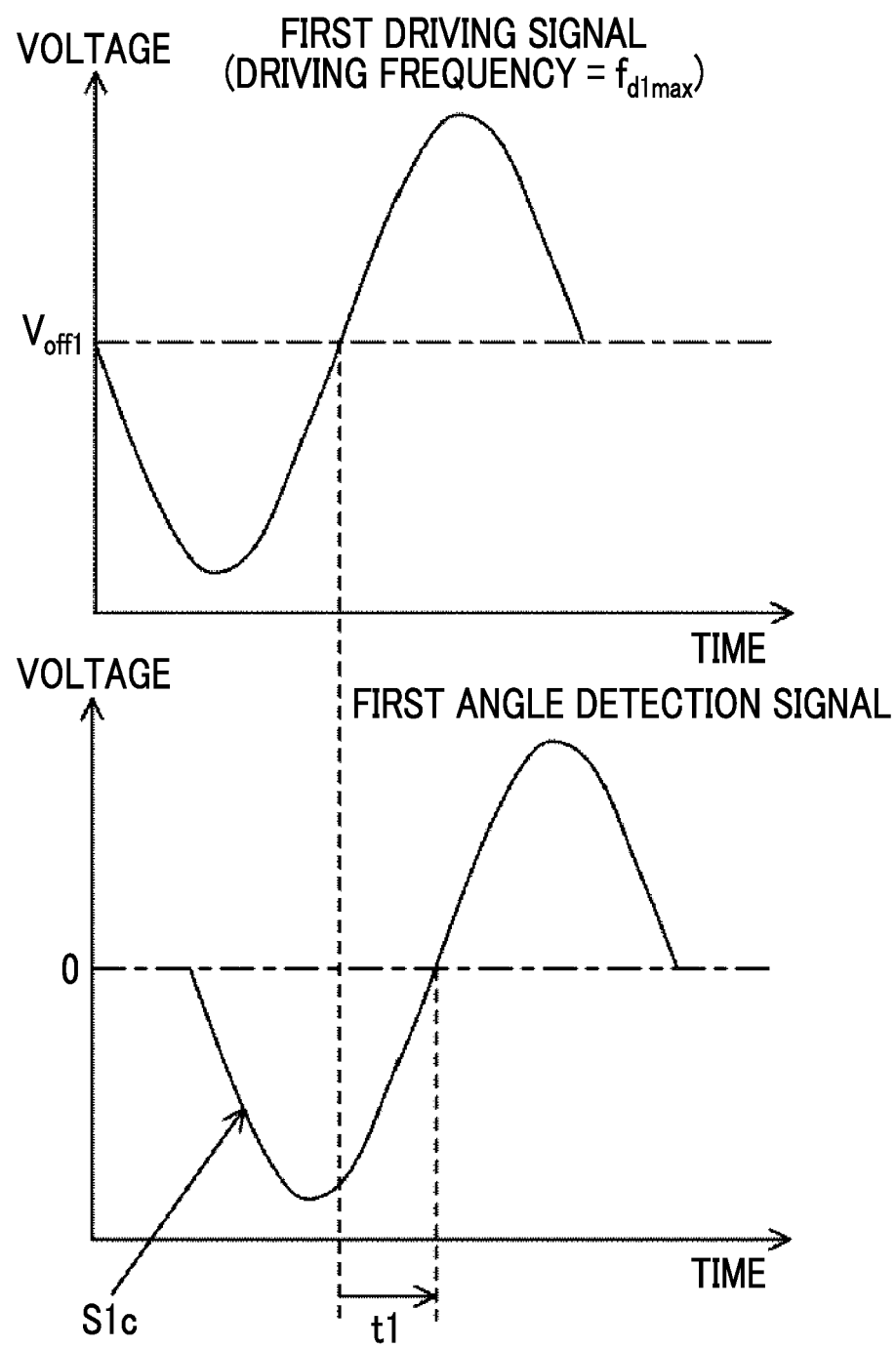
FIG. 16 is a diagram for describing the derivation processing of the first reference value.

Next, the first derivation portion 64A derives a phase difference between the first driving signal having the first driving frequency when the first angle is the maximum among the acquired plurality of first driving frequencies and the first angles, and the first angle detection signal S1$c$ detected when the first driving signal is provided to the first actuators 31, as the first reference value. The first derivation portion 64A derives the first reference value as a positive value based on the first driving signal. Specifically, as shown in FIG. 16 as an example, a time t1 from a point in time when the first driving signal having the first driving frequency of $f_{d1max}$ is zero to a point in time when the first angle detection signal S1$c$ is zero in a corresponding cycle is derived as the first reference value. In the present embodiment, the first driving signal is offset by an amount corresponding to the bias voltage $V_{off1}$. Thus, the point in time when the first driving signal is zero means a point in time when the first driving signal is $V_{off1}$. The first reference value may be a statistical value such as an average value, a mode, or a median of the time t1 in a plurality of cycles.

In addition, the first derivation portion 64A derives the driving condition (hereinafter, referred to as a "first driving condition") of the first actuators 31 under which the first driving frequency is less than the resonance frequency (hereinafter, referred to as a "first resonance frequency") around the first axis $a_1$. The first driving condition may be the driving voltage (hereinafter, referred to as a "first driving voltage") of the first driving signal, the first driving frequency, or both of the first driving voltage and the first driving frequency. For example, the driving voltage of the first driving signal corresponds to an amplitude of the first driving signal.

In the present embodiment, the first derivation portion 64A derives the first driving condition under which the phase difference (hereinafter, referred to as a "first phase difference") between the first driving signal and the first angle detection signal S1c is less than the first reference value. This is because it is difficult to directly obtain the first resonance frequency, and the first driving frequency when the first phase difference is the first reference value is regarded as the first resonance frequency.

In addition, the first derivation portion 64A derives the first driving frequency with which the first phase difference is less than the first reference value at a preset driving voltage, as an initial setting value before the drawing of the image. For example, the first derivation portion 64A sets the first driving voltage as a preset voltage value and finds the first driving frequency with which the first phase difference at a time of providing the first driving signal to the first actuators 31 while changing the first driving frequency is less than the first reference value.

In addition, before the drawing of the image, the first derivation portion 64A derives the first driving condition under which after the first actuators are driven based on the derived initial setting value, the first angle is an angle within a preset range and the first phase difference is less than the first reference value.

For example, in a case where the first angle is less than a lower limit value of the preset range, the first derivation portion 64A derives a voltage value higher than the current voltage value as the first driving voltage. In a case where the first angle exceeds an upper limit value of the preset range, the first derivation portion 64A derives a voltage value lower than the current voltage value as the first driving voltage. At this point, the first derivation portion 64A derives the first driving condition under which the first phase difference is less than the first reference value, based on a value V1 that represents a degree to which the immediately previous first phase difference is smaller than the first reference value. For example, in deriving the first driving condition, in a case where it is estimated that the first phase difference does not become less than the first reference value by changing only the voltage value of the first driving voltage based on the value V1, the first derivation portion 64A derives a value obtained by also changing the first driving frequency. The first derivation portion 64A repeats this processing of deriving the first driving condition a plurality of times. Accordingly, the first driving condition under which the first angle falls within the preset range and the first driving frequency is less than the first resonance frequency is derived before the drawing of the image.

In addition, even during the drawing of the image, the first resonance frequency may change due to an influence of the ambient temperature or the like. Thus, the first derivation portion 64A may repeat the processing of deriving the first driving condition a plurality of times even during the drawing of the image.

The second derivation portion 64B acquires a phase difference between the second driving signal and the second angle detection signal S2c when the second angle in a case of providing the second driving signal to the second actuators 32 while changing only the second driving frequency out of the first driving frequency and the second driving frequency is the maximum, as the reference value (hereinafter referred to as a "second reference value"). At this point, the first driving signal is not provided to the first actuators 31. That is, the second derivation portion 64B acquires the second reference value by causing the mirror portion 20 to swing around only the second axis $a_2$ and not swing around the first axis $a_1$.

Specifically, the second derivation portion 64B acquires the second angle that is derived by the second angle derivation portion 63B in a case of providing the second driving signal to the second actuators 32 while changing only the second driving frequency. The second angle is acquired for each of a plurality of second driving frequencies in the same manner as the processing performed by the first derivation portion 64A. The second driving frequency when the second angle is the maximum among combinations of the plurality of second driving frequencies and the second angles will be denoted by $f_{d2max}$.

Figure 17:
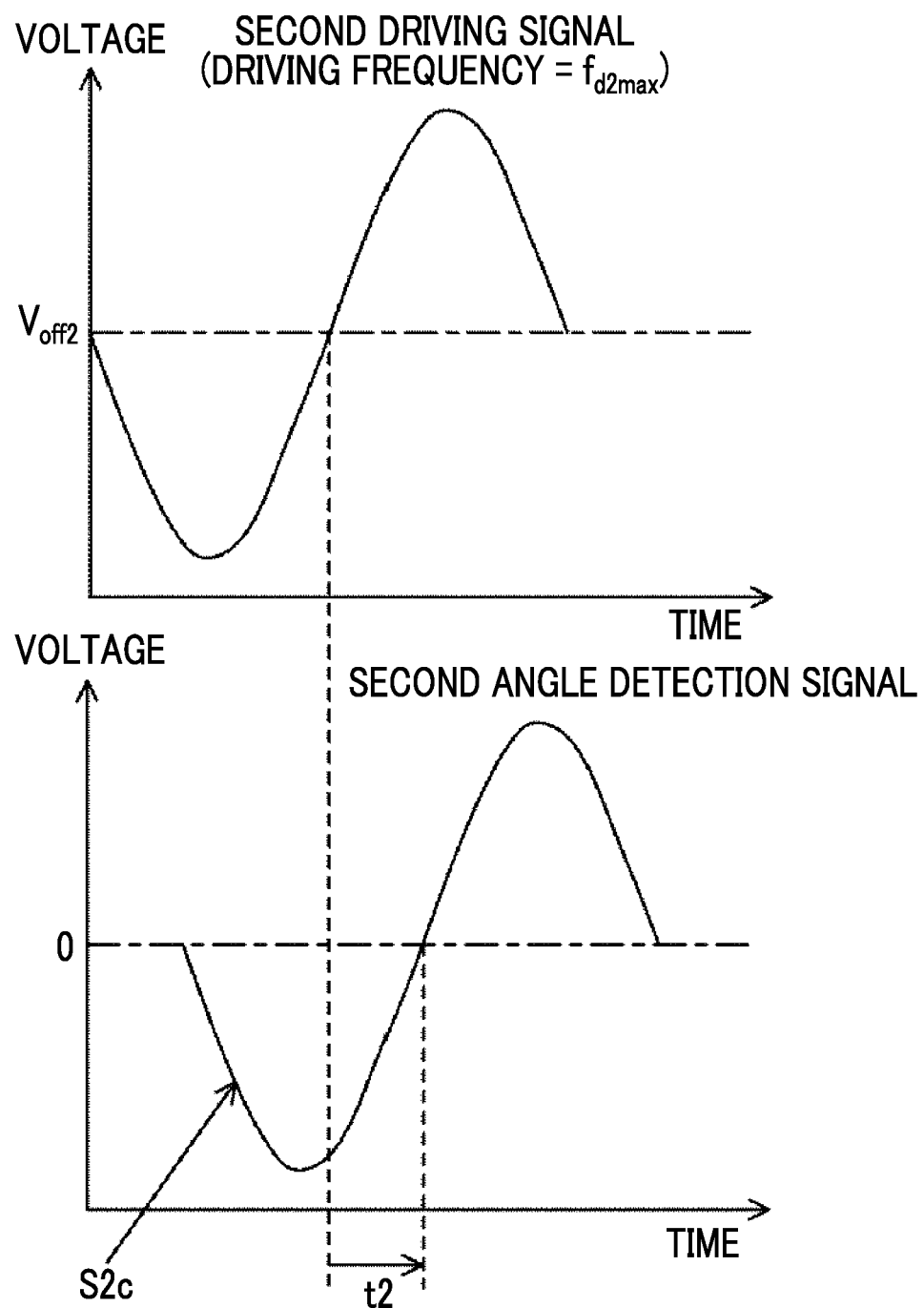
FIG. 17 is a diagram for describing derivation processing of a second reference value.

Next, the second derivation portion 64B derives a phase difference between the second driving signal having the second driving frequency when the second angle is the maximum among the acquired plurality of second driving frequencies and the second angles, and the second angle detection signal S2c detected when the second driving signal is provided to the second actuators 32, as the second reference value. The second derivation portion 64B derives the second reference value as a positive value based on the second driving signal Specifically, as shown in FIG. 17 as an example, a time t2 from a point in time when the second driving signal having the second driving frequency of $f_{d2max}$, is zero to a point in time when the second angle detection signal S2c is zero in a corresponding cycle is derived as the second reference value. In the present embodiment, the second driving signal is offset by an amount corresponding to the bias voltage $V_{off2}$. Thus, the point in time when the second driving signal is zero means a point in time when the second driving signal is $V_{off2}$. The second reference value may be a statistical value such as an average value, a mode, or a median of the time t2 in a plurality of cycles.

In addition, the second derivation portion 64B derives the driving condition (hereinafter, referred to as a "second driving condition") of the second actuators 32 under which the second driving frequency is greater than the resonance frequency (hereinafter, referred to as a "second resonance frequency") around the second axis $a_2$. The second driving condition may be the driving voltage (hereinafter, referred to as a "second driving voltage") of the second driving signal, the second driving frequency, or both of the second driving voltage and the second driving frequency. For example, the driving voltage of the second driving signal corresponds to an amplitude of the second driving signal.

In the present embodiment, the second derivation portion 64B derives the second driving condition under which the phase difference (hereinafter, referred to as a "second phase difference") between the second driving signal and the second angle detection signal S2c is greater than the second reference value. This is because it is difficult to directly obtain the second resonance frequency, and the second driving frequency when the second phase difference is the second reference value is regarded as the second resonance frequency.

The second derivation portion 64B derives the second driving frequency with which the second phase difference is greater than the second reference value at a preset driving voltage, as an initial setting value before the drawing of the image. For example, the second derivation portion 64B sets the second driving voltage as a preset voltage value and finds the second driving frequency with which the second phase difference is greater than the second reference value, by providing the second driving signal to the second actuators 32 while changing the second driving frequency.

In addition, before the drawing of the image, the second derivation portion 64B derives the second driving condition under which after the second actuators 32 are driven based on the derived initial setting value, the second angle is an angle within a preset range and the second phase difference is greater than the second reference value.

For example, in a case where the second angle is less than a lower limit value of the preset range, the second derivation portion 64B derives a voltage value higher than the current voltage value as the second driving voltage. In a case where the second angle exceeds an upper limit value of the preset range, the second derivation portion 64B derives a voltage value lower than the current voltage value as the second driving voltage. At this point, the second derivation portion 64B derives the second driving condition under which the second phase difference is greater than the second reference value, based on a value V2 that represents a degree to which the immediately previous second phase difference is greater than the second reference value. For example, in deriving the second driving condition, in a case where it is estimated that the second phase difference does not become greater than the second reference value by changing only the voltage value of the second driving voltage based on the value V2, the second derivation portion 64B derives a value obtained by also changing the second driving frequency. The second derivation portion 64B repeats this processing of deriving the second driving condition a plurality of times. Accordingly, the second driving condition under which the second angle falls within the preset range and the second driving frequency is greater than the second resonance frequency is derived before the drawing of the image.

In addition, even during the drawing of the image, the second resonance frequency may change due to an influence of the ambient temperature or the like. Thus, the second derivation portion 64B may repeat the processing of deriving the second driving condition a plurality of times even during the drawing of the image.

The first zero cross pulse output portion 65A generates a reference signal (hereinafter, referred to as a "first reference signal") based on the first angle detection signal S1c. The first reference signal is a signal representing that the angle of the mirror portion 20 around the first axis $a_1$ is equal to a reference angle. In the present embodiment, an example of applying zero as this reference angle will be described. That is, the first zero cross pulse output portion 65A generates a zero cross pulse (hereinafter, referred to as a "first zero cross pulse") ZC1 as an example of the first reference signal based on the first angle detection signal S1c. The first zero cross pulse output portion 65A is configured with a zero cross detection circuit. The first zero cross pulse is a zero cross signal representing that the angle of the mirror portion 20 around the first axis $a_1$ is zero.

Figure 18:
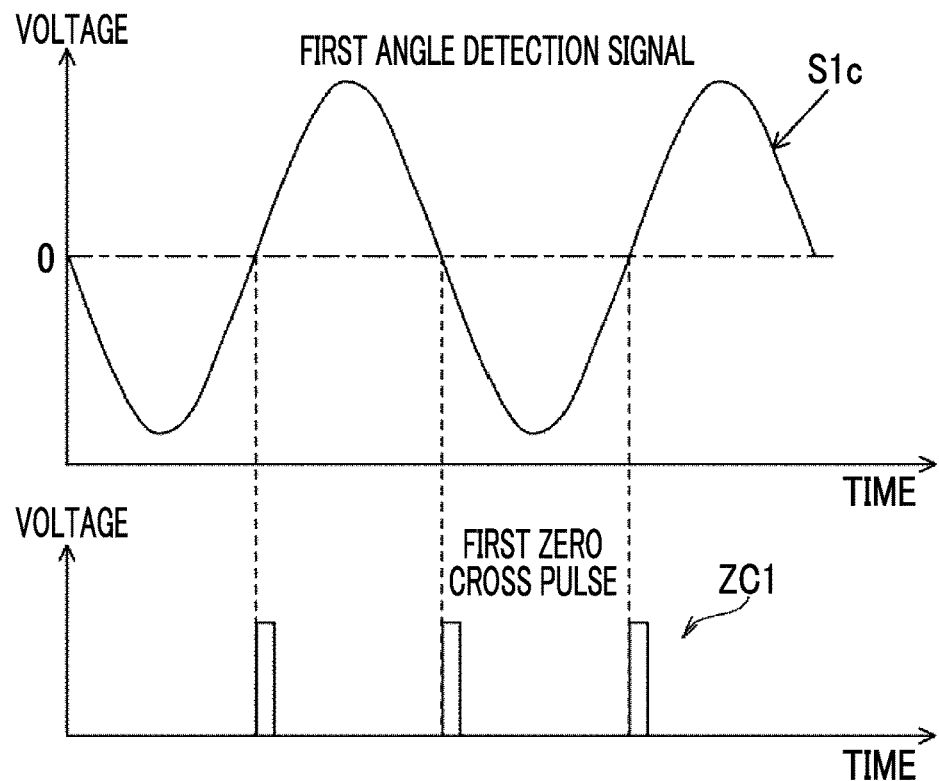
FIG. 18 is a diagram for describing generation processing of a first zero cross pulse.

As shown in FIG. 18 as an example, the first zero cross pulse output portion 65A generates the first zero cross pulse ZC1 at a timing at which the first angle detection signal S1c crosses zero. The first zero cross pulse output portion 65A outputs the generated first zero cross pulse ZC1 to the light source driving portion 66.

The second zero cross pulse output portion 65B generates a reference signal (hereinafter, referred to as a "second reference signal") based on the second angle detection signal S2c. The second reference signal is a signal representing that the angle of the mirror portion 20 around the second axis as is equal to the reference angle. In the present embodiment, an example of applying zero as this reference angle will be described. That is, the second zero cross pulse output portion 65B generates a zero cross pulse (hereinafter, referred to as a "second zero cross pulse") ZC2 as an example of the second reference signal based on the second angle detection signal S2c. The second zero cross pulse output portion 65B is configured with a zero cross detection circuit. The second zero cross pulse is a zero cross signal representing that the angle of the mirror portion 20 around the second axis $a_2$ is zero.

Figure 19:
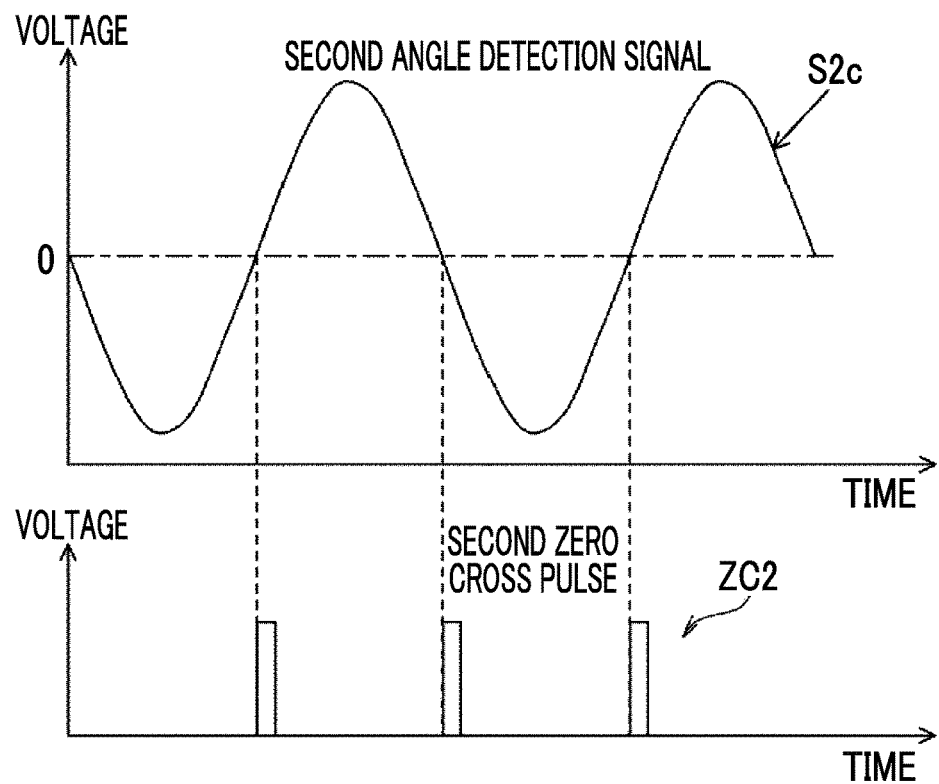
FIG. 19 is a diagram for describing generation processing of a second zero cross pulse.

As shown in FIG. 19 as an example, the second zero cross pulse output portion 65B generates the second zero cross pulse ZC2 at a timing at which the second angle detection signal S2c crosses zero. The second zero cross pulse output portion 65B outputs the generated second zero cross pulse ZC2 to the light source driving portion 66.

While the first zero cross pulse output portion 65A and the second zero cross pulse output portion 65B output the zero cross pulses at both of the timing when the sinusoidal wave becomes zero from a negative value toward a positive value and the timing when the sinusoidal wave becomes zero from a positive value toward a negative value, the present disclosure is not limited thereto. For example, the first zero cross pulse output portion 65A and the second zero cross pulse output portion 65B may output the zero cross pulses at any one of the timing when the sinusoidal wave becomes zero from a negative value toward a positive value and the timing when the sinusoidal wave becomes zero from a positive value toward a negative value.

The light source driving portion 66 drives the light source 3 based on, for example, drawing data supplied from an outside of the image drawing system 10. In addition, the light source driving portion 66 controls an irradiation timing of the laser light by the light source 3 so that the irradiation timing is synchronized with the first zero cross pulse ZC1 and the second zero cross pulse ZC2. Accordingly, the image is drawn on the surface to be scanned 6.

Next, a flow of reference value derivation processing of deriving the first reference value and the second reference value will be described with reference to FIG. 20. For example, the reference value derivation processing is executed when the optical scanning device 2 is started or at a timing at which an execution instruction is input by a user.

Figure 20:
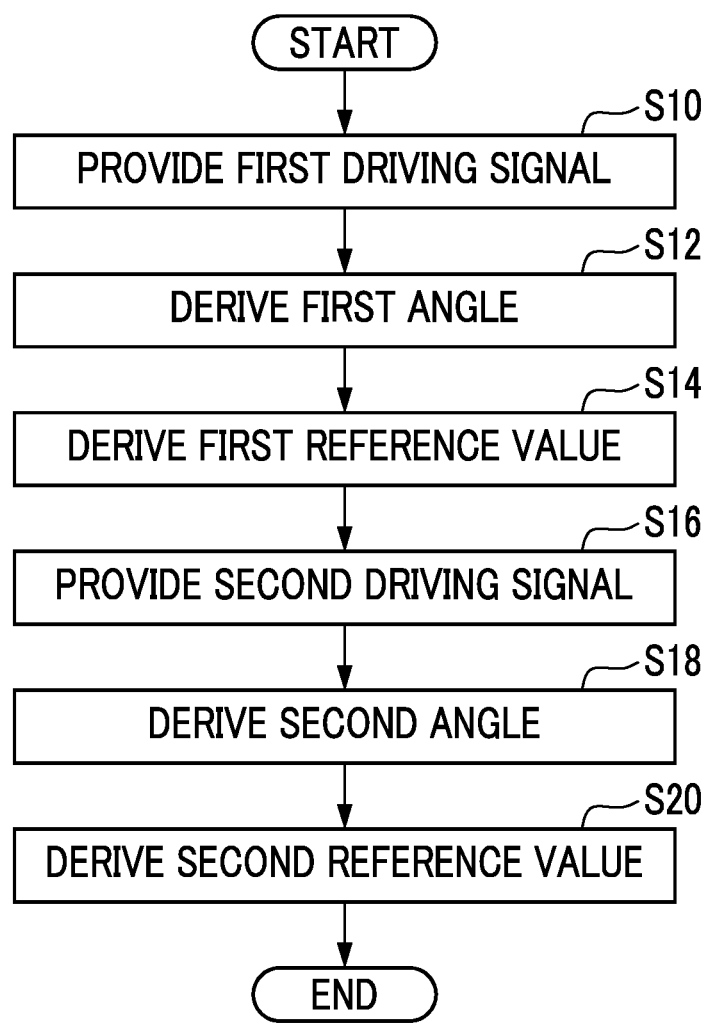
FIG. 20 is a flowchart showing an example of reference value derivation processing.

In step S10 in FIG. 20, the first driving signal generation portion 60A generates the first driving signal and provides the generated first driving signal to the pair of first actuators 31 through the first phase shift portion 62A. Accordingly, the mirror portion 20 swings around only the first axis $a_1$ and does not swing around the second axis $a_2$.

In step S12, as described above, the first angle derivation portion 63A derives the first angle based on the first angle detection signal S1c. The processing in steps S10 and S12 is repeatedly executed while the first driving frequency is changed. Accordingly, the first angle is acquired for each of the plurality of first driving frequencies. In a case the repetition of the processing in steps S10 and S12 is finished, the first driving signal generation portion 60A stops generating the first driving signal.

In step S14, the first derivation portion 64A derives the phase difference between the first driving signal having the first driving frequency when the first angle is the maximum among the plurality of first driving frequencies and the first angles acquired by the repetition of the processing in steps S10 and S12, and the first angle detection signal S1c detected when the first driving signal is provided to the first actuators 31, as the first reference value.

In step S16, the second driving signal generation portion 60B generates the second driving signal and provides the generated second driving signal to the pair of second actuators 32 through the second phase shift portion 62B. Accordingly, the mirror portion 20 swings around only the second axis a₂ and does not swing around the first axis a₁.

In step S18, as described above, the second angle derivation portion 63B derives the second angle based on the second angle detection signal S2c. The processing in steps S16 and S18 is repeatedly executed while the second driving frequency is changed. Accordingly, the second angle is acquired for each of the plurality of second driving frequencies. In a case the repetition of the processing in steps S16 and S18 is finished, the second driving signal generation portion 60B stops generating the second driving signal.

In step S20, the second derivation portion 64B derives the phase difference between the second driving signal having the second driving frequency when the second angle is the maximum among the plurality of second driving frequencies and the second angles acquired by the repetition of the processing in steps S16 and S18, and the second angle detection signal S2c detected when the second driving signal is provided to the second actuators 32, as the second reference value. In a case where the processing in step S20 is finished, the reference value derivation processing is finished.

Next, a flow of initial setting value derivation processing will be described with reference to FIG. 21. For example, the initial setting value derivation processing is executed before the drawing of the image after the execution of the reference value derivation processing is finished.

Figure 21:
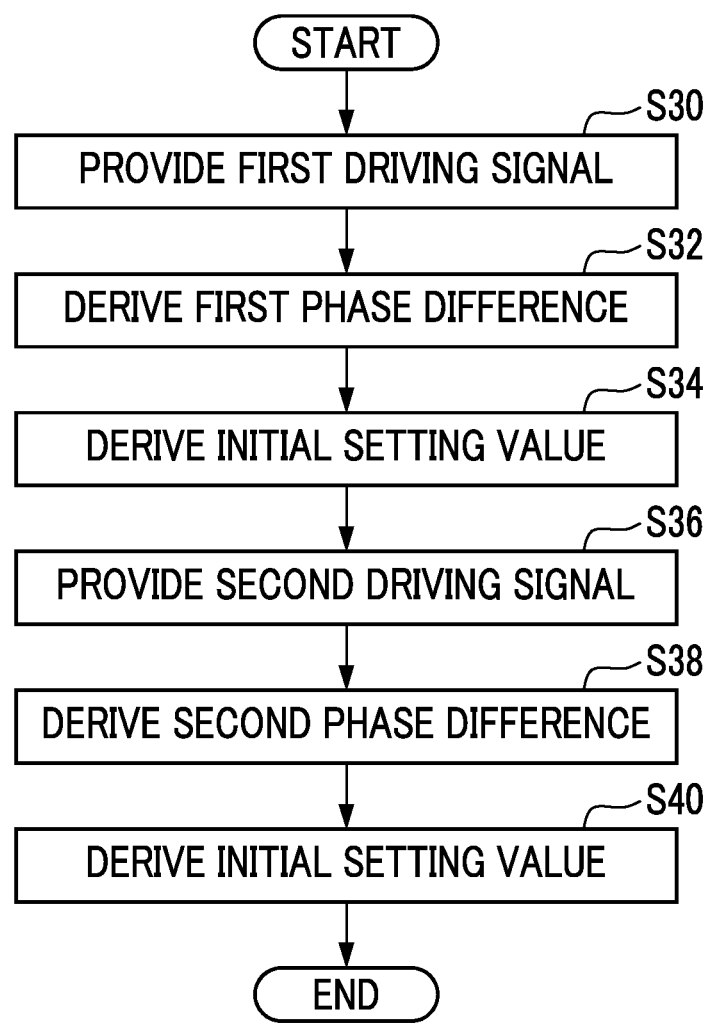
FIG. 21 is a flowchart showing an example of initial setting value derivation processing.

In step S30 in FIG. 21, the first driving signal generation portion 60A generates the first driving signal having the preset driving voltage and provides the generated first driving signal to the pair of first actuators 31 through the first phase shift portion 62A. In step S32, the first derivation portion 64A derives the first phase difference. The processing in steps S30 and S32 is repeatedly executed while the first driving frequency is changed. Accordingly, the first phase difference is acquired for each of the plurality of first driving frequencies. In a case the repetition of the processing in steps S30 and S32 is finished, the first driving signal generation portion 60A stops generating the first driving signal.

In step S34, the first derivation portion 64A finds the first driving frequency with which the first phase difference is less than the first reference value derived in step S14, from a result of the repetition of the processing in steps S30 and S32 as the initial setting value of the first driving condition. Accordingly, the first derivation portion 64A derives the first driving frequency as the initial setting value. The preset driving voltage and the first driving frequency derived in step S34 are the initial setting value of the first driving condition.

In step S36, the second driving signal generation portion 60B generates the second driving signal having the preset driving voltage and provides the generated second driving signal to the pair of second actuators 32 through the second phase shift portion 62B. In step S38, the second derivation portion 64B derives the second phase difference. The processing in steps S36 and S38 is repeatedly executed while the second driving frequency is changed. Accordingly, the second phase difference is acquired for each of the plurality of second driving frequencies. In a case the repetition of the processing in steps S36 and S38 is finished, the second driving signal generation portion 60B stops generating the second driving signal.

In step S40, the second derivation portion 64B finds the second driving frequency with which the second phase difference is greater than the second reference value derived in step S20, from a result of the repetition of the processing in steps S36 and S38 as the initial setting value of the second driving condition. Accordingly, the second derivation portion 64B derives the second driving frequency as the initial setting value. The preset driving voltage and the second driving frequency derived in step S40 are the initial setting value of the second driving condition. In a case where the processing in step S40 is finished, the initial setting value derivation processing is finished.

Next, a flow of first driving condition derivation processing will be described with reference to FIG. 22. For example, the first driving condition derivation processing is executed before the drawing of the image after the execution of the initial setting value derivation processing is finished.

Figure 22:
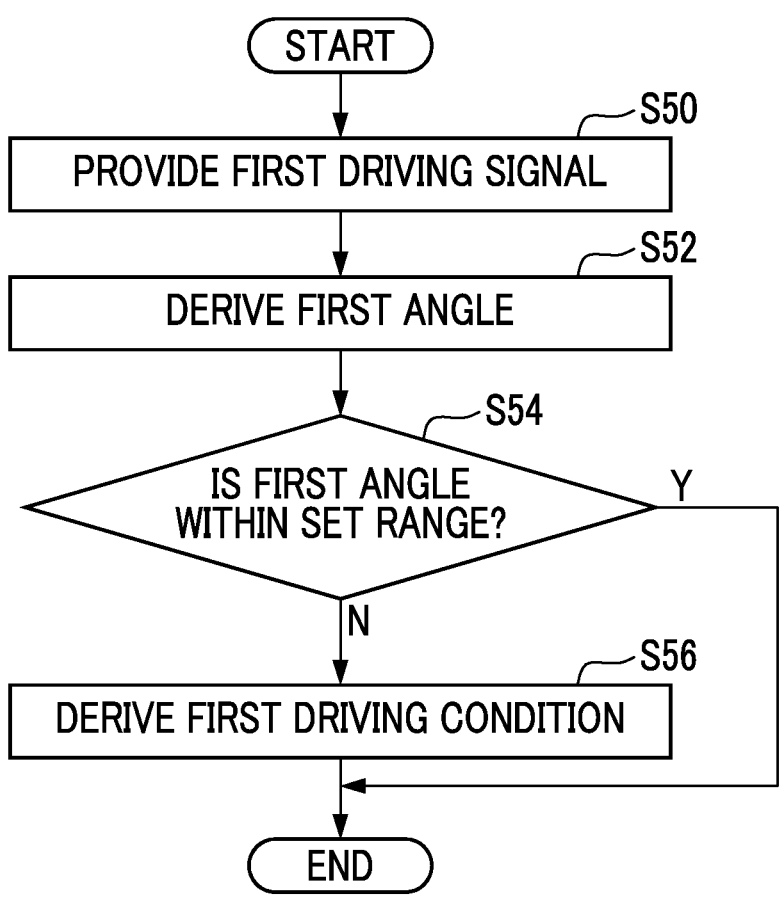
FIG. 22 is a flowchart showing an example of first driving condition derivation processing.

In step S50 in FIG. 22, the first driving signal generation portion 60A generates the first driving signal in accordance with the initial setting value derived in step S34 and provides the generated first driving signal to the pair of first actuators 31 through the first phase shift portion 62A. In step S52, as described above, the first angle derivation portion 63A derives the first angle based on the first angle detection signal S1c.

In step S54, the first derivation portion 64A determines whether or not the first angle derived in step S52 is within the preset range. For example, this range is set in advance in accordance with a length of the image drawn on the surface to be scanned 6 in the X direction. In a case where this determination results in a negative determination, the processing transitions to step S56.

In step S56, as described above, the first derivation portion 64A derives the first driving condition under which the first angle is an angle within the preset range and the first phase difference is less than the first reference value. The first driving frequency and the first driving voltage are changed in accordance with the first driving condition. In a case where the processing in step S56 is finished, the first driving condition derivation processing is finished. In addition, in a case where the determination in step S54 results in a positive determination, the first driving condition derivation processing is finished. The processing in steps S52 to S56 is repeatedly executed a plurality of times. Accordingly, the first driving condition under which the first angle falls within the preset range and the first phase difference is less than the first reference value is set.

The processing in steps S52 to S56 of the first driving condition derivation processing may be repeatedly executed even during the drawing of the image. Examples of an execution interval in this case include a time interval corresponding to one cycle or a plurality of cycles of the first driving frequency.

Next, a flow of second driving condition derivation processing will be described with reference to FIG. 23. For example, the second driving condition derivation processing is executed before the drawing of the image after the execution of the initial setting value derivation processing is finished.

Figure 23:
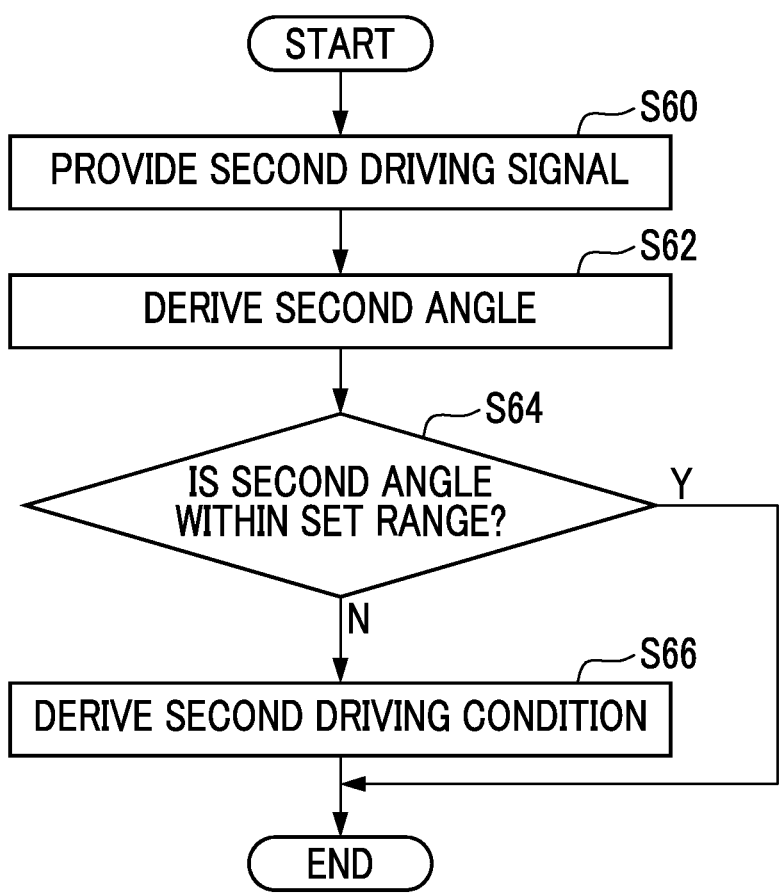
FIG. 23 is a flowchart showing an example of second driving condition derivation processing.

In step S60 in FIG. 23, the second driving signal generation portion 60B generates the second driving signal in accordance with the initial setting value derived in step S40 and provides the generated second driving signal to the pair of second actuators 32 through the second phase shift portion 62B. In step S62, as described above, the second angle derivation portion 63B derives the second angle based on the second angle detection signal S2c.

In step S64, the second derivation portion 64B determines whether or not the second angle derived in step S62 is within the preset range. For example, this range is set in advance in accordance with a length of the image drawn on the surface to be scanned 6 in the Y direction. In a case where this determination results in a negative determination, the processing transitions to step S66.

In step S66, as described above, the second derivation portion 64B derives the second driving condition under which the second angle is an angle within the preset range and the second phase difference is greater than the second reference value. The second driving frequency and the second driving voltage are changed in accordance with the second driving condition. In a case where the processing in step S66 is finished, the second driving condition derivation processing is finished. In addition, in a case where the determination in step S64 results in a positive determination, the second driving condition derivation processing is finished. The processing in steps S62 to S66 is repeatedly executed a plurality of times. Accordingly, the second driving condition under which the second angle falls within the preset range and the second phase difference is greater than the second reference value is set.

The processing in steps S62 to S66 of the second driving condition derivation processing may be repeatedly executed even during the drawing of the image. Examples of an execution interval in this case include a time interval corresponding to one cycle or a plurality of cycles of the second driving frequency.

As described above, according to the present embodiment, the first actuators 31 are driven in accordance with the first driving condition under which the first driving frequency is less than the first resonance frequency. Accordingly, since the first driving frequency exceeding the first resonance frequency is suppressed, a rapid change in first deflection angle is suppressed. Accordingly, the image can be stably drawn.

The configuration of the MMD 4 shown in the embodiment is an example. The configuration of the MMD 4 can be variously modified. For example, the first actuators 31 that cause the mirror portion 20 to swing around the first axis $a_1$ may be arranged in the second movable frame 24, and the second actuators 32 that cause the mirror portion 20 to swing around the second axis $a_2$ may be arranged in the first movable frame 22.

Figure 24:
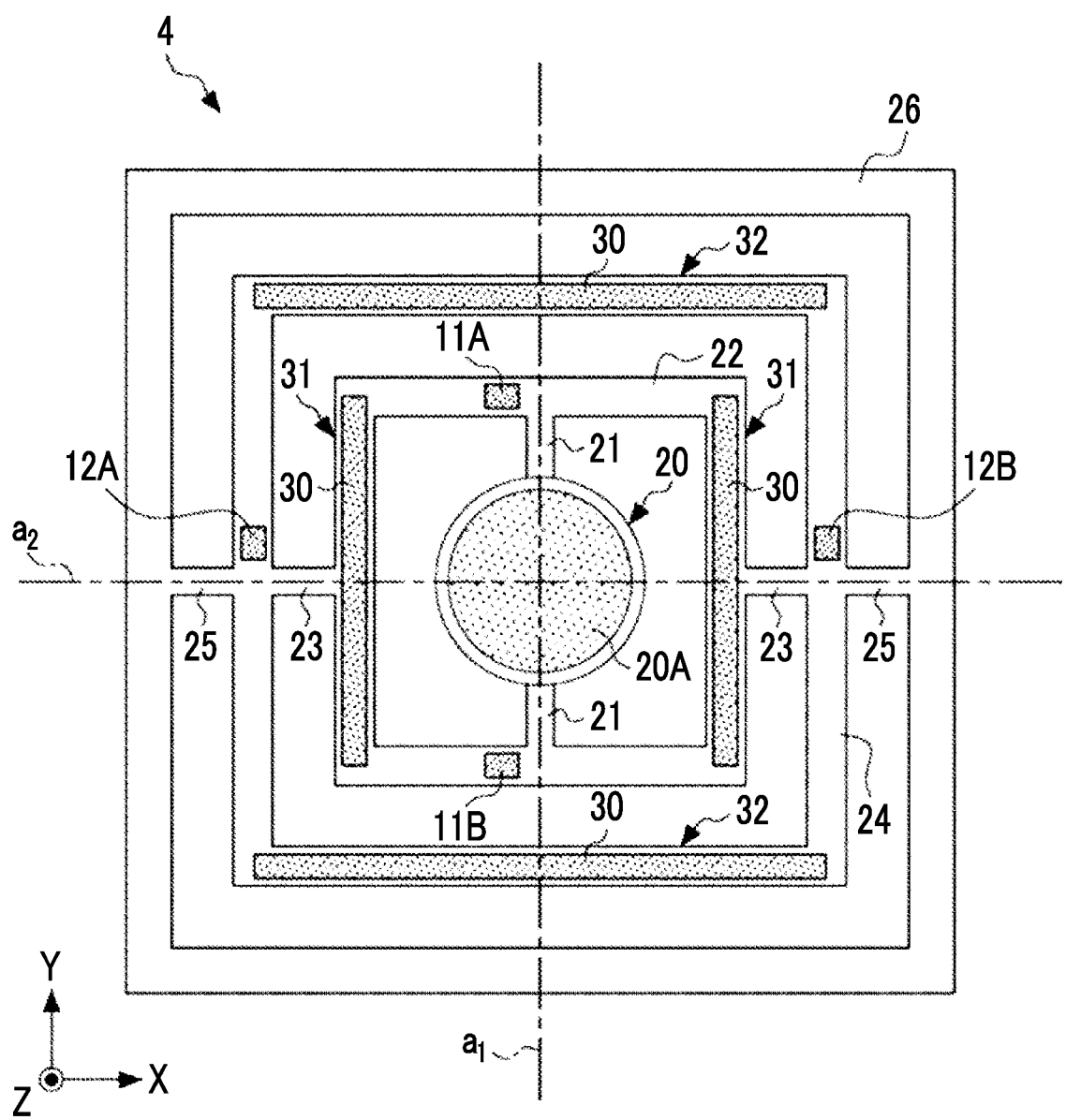
FIG. 24 is a plan view of a micromirror device according to a modification example.

In addition, in the embodiment, while a case where the pair of first angle detection sensors 11A and 11B are arranged at positions that face each other with the first axis $a_1$ interposed therebetween is described, the present disclosure is not limited thereto. For example, as shown in FIG. 24, the pair of first angle detection sensors 11A and 11B may be arranged at positions that face each other with the second axis $a_2$ interposed therebetween. In the example in FIG. 24, each of the pair of first angle detection sensors 11A and 11B is arranged near the first support portions 21 on the first movable frame 22. The first angle detection sensor 11A is arranged near the first support portion 21 connected to one side of the mirror portion 20. The first angle detection sensor 11B is arranged near the first support portion 21 connected to the other side of the mirror portion 20. Accordingly, the pair of first angle detection sensors 11A and 11B are arranged at positions that face each other with the second axis $a_2$ interposed therebetween and face each other with the mirror portion 20 interposed therebetween. In addition, the pair of first angle detection sensors 11A and 11B are arranged at positions that are shifted in the same direction (in the example in FIG. 24, the −X direction) from the first axis $a_1$.

As in the embodiment, in a case where the pair of first angle detection sensors 11A and 11B are arranged at positions that face each other with the first axis $a_1$ interposed therebetween, the vibration noise can be removed by subtracting one of the output signals of both of the first angle detection sensors 11A and 11B from the other. On the other hand, as in this form example, in a case where the pair of first angle detection sensors 11A and 11B are arranged at positions that face each other with the second axis $a_2$ interposed therebetween, the vibration noise can be removed by adding the output signals of both of the first angle detection sensors 11A and 11B.

Figure 25:
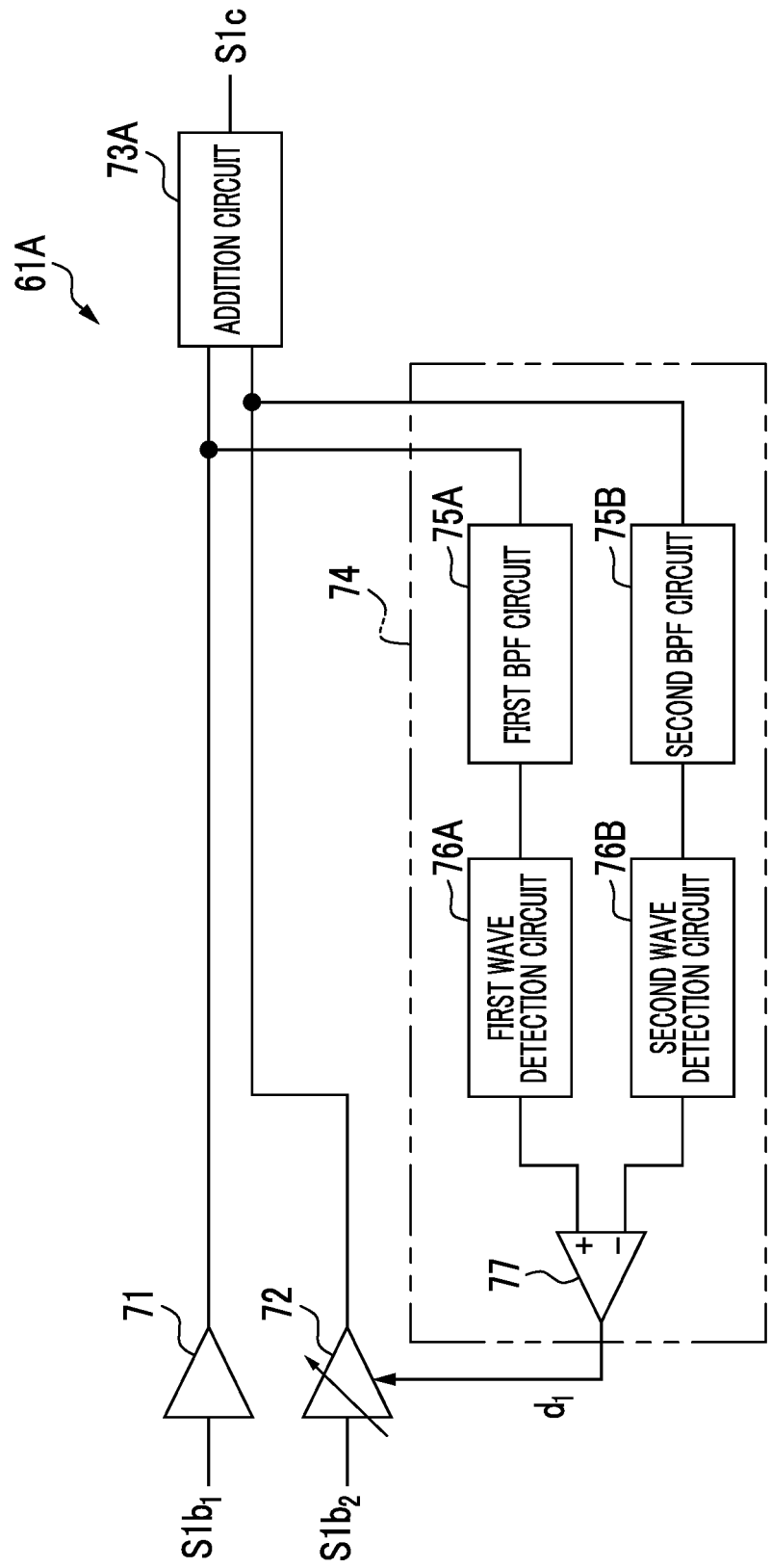
FIG. 25 is a circuit diagram showing a configuration of a first signal processing portion according to the modification example.

An example of a configuration of the first signal processing portion 61A in this form example is shown in FIG. 25. As shown in FIG. 25, in this form example, the first signal processing portion 61A includes an addition circuit 73A instead of the subtraction circuit 73. The addition circuit 73A outputs a value obtained by adding the signal $S1b_1$ input from the first angle detection sensor 11A through the buffer amplifier 71 to the signal $S1b_2$ input from the first angle detection sensor 11B through the variable gain amplifier 72.

In addition, in the embodiment, while a case where the pair of second angle detection sensors 12A and 12B are arranged at positions that face each other with the second axis $a_2$ interposed therebetween is described, the present disclosure is not limited thereto. For example, as shown in FIG. 24, the pair of second angle detection sensors 12A and 12B may be arranged at positions that face each other with the first axis $a_1$ interposed therebetween. In the example in FIG. 24, each of the pair of second angle detection sensors 12A and 12B is arranged near the second support portions 23 on the second movable frame 24. The second angle detection sensor 12A is arranged near the second support portion 23 connected to one side of the first movable frame 22. The second angle detection sensor 12B is arranged near the second support portion 23 connected to the other side of the first movable frame 22. Accordingly, the pair of second angle detection sensors 12A and 12B are arranged at positions that face each other with the first axis $a_1$ interposed therebetween and face each other with the mirror portion 20 and the first movable frame 22 interposed therebetween. In addition, the pair of second angle detection sensors 12A and 12B are arranged at positions that are shifted in the same direction (in the example in FIG. 24, the +Y direction) from the second axis $a_2$.

As in the embodiment, in a case where the pair of second angle detection sensors 12A and 12B are arranged at positions that face each other with the second axis $a_2$ interposed therebetween, the vibration noise can be removed by subtracting one of the output signals of both of the second angle detection sensors 12A and 12B from the other. On the other hand, as in this form example, in a case where the pair of second angle detection sensors 12A and 12B are arranged at positions that face each other with the first axis $a_1$ interposed therebetween, the vibration noise can be removed by adding the output signals of both of the second angle detection sensors 12A and 12B. A configuration of the second signal processing portion 61B in this form example can be implemented by the same configuration as the first signal processing portion 61A shown in FIG. 25 and thus, will not be described.

In addition, in the embodiment, a form of providing any one of the pair of first angle detection sensors 11A and 11B in the MMD 4 may be applied. Similarly, a form of providing any one of the pair of second angle detection sensors 12A and 12B in the MMD 4 may be applied.

In addition, in the embodiment, in a case where a plurality of candidates of the first driving condition and the second driving condition derived by the first derivation portion 64A and the second derivation portion 64B are present, it is preferable that the first driving condition and the second driving condition having the lowest power consumption are selected.

In addition, a hardware configuration of the driving controller 5 can be variously modified. The driving controller 5 can be configured using at least one of an analog operation circuit or a digital operation circuit. The driving controller 5 may be configured with one processor or may be configured with a combination of two or more processors of the same type or different types. Examples of the processor include a central processing unit (CPU), a programmable logic device (PLD), and a dedicated electric circuit. As is well known, the CPU is a general-purpose processor that executes software (program) to function as various processing portions. The PLD is a processor such as a field programmable gate array (FPGA) that has a circuit configuration changeable after manufacturing. The dedicated electric circuit is a processor such as an application specific integrated circuit (ASIC) that has a circuit configuration dedicatedly designed to perform specific processing.

What is claimed is:

1. A system having an optical scanning device comprising:
    a mirror portion that has a reflecting surface on which an incidence ray is reflected;
    a first actuator that causes the mirror portion to swing around a first axis which is in a plane including the reflecting surface at a time of a standstill of the mirror portion;
    a second actuator that causes the mirror portion to swing around a second axis which is in the plane including the reflecting surface at the time of the standstill of the mirror portion and intersects with the first axis; and
    at least one processor,
    wherein the processor is configured to
        provide a first driving signal having a first driving frequency to the first actuator,
        provide a second driving signal having a second driving frequency to the second actuator, and
        derive a first driving condition of the first actuator under which the first driving frequency is less than a first resonance frequency around the first axis.

2. The system according to claim 1, further comprising:
    a first angle detection sensor that outputs a signal corresponding to an angle of the mirror portion around the first axis,
    wherein the processor is configured to
        derive a first angle of the mirror portion around the first axis based on the output signal of the first angle detection sensor,
        acquire a phase difference between the first driving signal when the first angle in a case of providing the first driving signal to the first actuator while changing only the first driving frequency out of the first driving frequency and the second driving frequency is the maximum, and the output signal of the first angle detection sensor as a first reference value, and
        derive the first driving condition under which the phase difference between the first driving signal and the output signal of the first angle detection sensor is less than the first reference value.

3. The system according to claim 2,
    wherein the processor is configured to acquire the first reference value as a positive value based on the first driving signal.

4. The system according to claim 2,
    wherein the processor is configured to, as an initial setting value before drawing of an image, derive the first driving frequency that is less than the first resonance frequency at a preset driving voltage of the first driving signal.

5. The system according to claim 4,
    wherein the processor is configured to,
        before the drawing of the image, drive the first actuator based on the initial setting value, and
        repeat processing of deriving the first driving condition under which the first angle is an angle within a preset range and the first driving frequency is less than the first resonance frequency, a plurality of times.

6. The system according to claim 5,
    wherein the processor is configured to, during the drawing of the image, repeat the processing of deriving the first driving condition under which the first angle is the angle within the preset range and the first driving frequency is less than the first resonance frequency, a plurality of times.

7. The system according to claim 2,
    wherein the first angle detection sensor includes a pair of angle detection sensors arranged at positions that face each other with the first axis or the second axis interposed between the positions, and
    the output signal of the first angle detection sensor is an output signal obtained by adding or subtracting a pair of output signals output from the pair of angle detection sensors.

8. The system according to claim 1,
    wherein the processor is configured to derive a second driving condition of the second actuator under which the second driving frequency is greater than a second resonance frequency around the second axis.

9. The system according to claim 8, further comprising:
    a second angle detection sensor that outputs a signal corresponding to an angle of the mirror portion around the second axis,
    wherein the processor is configured to
        derive a second angle of the mirror portion around the second axis based on the output signal of the second angle detection sensor,
        acquire a phase difference between the second driving signal when the second angle in a case of providing the second driving signal to the second actuator while changing only the second driving frequency out of the first driving frequency and the second driving frequency is the maximum, and the output signal of the second angle detection sensor as a second reference value, and
        derive the second driving condition under which the phase difference between the second driving signal and the output signal of the second angle detection sensor is greater than the second reference value.

10. The system according to claim 9,
    wherein the processor is configured to acquire the second reference value as a positive value based on the second driving signal.

11. The system according to claim 9,
    wherein the processor is configured to, as an initial setting value before drawing of an image, derive the second driving frequency that is greater than the second resonance frequency at a preset driving voltage of the second driving signal.

12. The system according to claim 11,
wherein the processor is configured to,
- before the drawing of the image, drive the second actuator based on the initial setting value, and
- repeat processing of deriving the second driving condition under which the second angle is an angle within a preset range and the second driving frequency is greater than the second resonance frequency, a plurality of times.

13. The system according to claim 12,
wherein the processor is configured to, during the drawing of the image, repeat the processing of deriving the second driving condition under which the second angle is the angle within the preset range and the second driving frequency is greater than the second resonance frequency, a plurality of times.

14. The system according to claim 9,
wherein the second angle detection sensor includes a pair of angle detection sensors arranged at positions that face each other with the first axis or the second axis interposed between the positions, and
the output signal of the second angle detection sensor is an output signal obtained by adding or subtracting a pair of output signals output from the pair of angle detection sensors.

15. The system according to claim 8,
wherein the second driving condition is at least one of the second driving frequency or a driving voltage of the second driving signal.

16. The system according to claim 1,
wherein the first driving frequency is higher than the second driving frequency.

17. The system according to claim 1,
wherein the first driving condition is at least one of the first driving frequency or a driving voltage of the first driving signal.

18. The system according to claim 1, where the system is an image drawing system further comprising:
a light source that irradiates the mirror portion with light.

19. A driving method of an optical scanning device including a mirror portion that has a reflecting surface on which an incidence ray is reflected, a first actuator that causes the mirror portion to swing around a first axis which is in a plane including the reflecting surface at a time of a standstill of the mirror portion, and a second actuator that causes the mirror portion to swing around a second axis which is in the plane including the reflecting surface at the time of the standstill of the mirror portion and intersects with the first axis, the driving method comprising:
- providing a first driving signal having a first driving frequency to the first actuator;
- providing a second driving signal having a second driving frequency to the second actuator; and
- deriving a first driving condition of the first actuator under which the first driving frequency is less than a first resonance frequency around the first axis.

* * * * *